(12) United States Patent
Grunlan et al.

(10) Patent No.: US 10,343,185 B2
(45) Date of Patent: Jul. 9, 2019

(54) FLAME RETARDANT NANOCOATED SUBSTRATE

(71) Applicant: The Texas A&M University System, College Station, TX (US)

(72) Inventors: Jaime C. Grunlan, College Station, TX (US); Tyler C. Guin, Bryan, TX (US)

(73) Assignee: The Texas A&M University System, College Station, TX (US)

( * ) Notice: Subject to any disclaimer, the term of this patent is extended or adjusted under 35 U.S.C. 154(b) by 122 days.

(21) Appl. No.: 15/300,176

(22) PCT Filed: Mar. 27, 2015

(86) PCT No.: PCT/US2015/022919
§ 371 (c)(1),
(2) Date: Sep. 28, 2016

(87) PCT Pub. No.: WO2015/148886
PCT Pub. Date: Oct. 1, 2015

(65) Prior Publication Data
US 2017/0183509 A1    Jun. 29, 2017

Related U.S. Application Data

(60) Provisional application No. 61/971,964, filed on Mar. 28, 2014.

(51) Int. Cl.
*B05D 1/36* (2006.01)
*B32B 5/02* (2006.01)
(Continued)

(52) U.S. Cl.
CPC ................. *B05D 1/36* (2013.01); *B32B 5/02* (2013.01); *C08J 9/365* (2013.01); *C09D 5/185* (2013.01);
(Continued)

(58) Field of Classification Search
None
See application file for complete search history.

(56) References Cited

U.S. PATENT DOCUMENTS

| | | |
|---|---|---|
| 4,246,146 A | 1/1981 | Wood et al. |
| 5,749,948 A | 5/1998 | Scholz et al. |

(Continued)

FOREIGN PATENT DOCUMENTS

WO    2013101975    7/2013

OTHER PUBLICATIONS

Wikipedia; Ultrasonic cleaning; as published Aug. 16, 2012; retrievable at https://web.archive.org/web/20120816175827/https://en.wikipedia.org/wiki/Ultrasonic_cleaning.*

(Continued)

*Primary Examiner* — Michael P. Rodriguez
(74) *Attorney, Agent, or Firm* — Tumey L.L.P.

(57) ABSTRACT

A method includes coating a substrate to provide a flame resistant substrate. In an embodiment, the method includes exposing the substrate to a cationic solution to produce a cationic layer deposited on the substrate. The cationic solution comprises cationic materials. The cationic materials comprise a polymer, a colloidal particle, a nanoparticle, a nitrogen-rich molecule, a geopolymer, a carbon-based filler, or any combinations thereof. The method also includes agitating the substrate. The method further includes exposing the cationic layer to an anionic solution to produce an anionic layer deposited on the cationic layer to produce a layer comprising the anionic layer and the cationic layer. The anionic solution comprises a layerable material.

18 Claims, 14 Drawing Sheets

(51) Int. Cl.
    *D06M 13/44*     (2006.01)
    *C09D 5/18*      (2006.01)
    *C08J 9/36*      (2006.01)
    *D06M 10/02*     (2006.01)
    *D06M 11/72*     (2006.01)
    *D06M 11/79*     (2006.01)
    *D06M 15/285*    (2006.01)
    *D06M 15/61*     (2006.01)
    *D06M 101/06*    (2006.01)

(52) U.S. Cl.
    CPC ............ *D06M 10/02* (2013.01); *D06M 11/72* (2013.01); *D06M 11/79* (2013.01); *D06M 13/44* (2013.01); *D06M 15/285* (2013.01); *D06M 15/61* (2013.01); *C08J 2201/038* (2013.01); *C08J 2205/05* (2013.01); *C08J 2205/06* (2013.01); *C08J 2375/04* (2013.01); *C08J 2375/06* (2013.01); *C08J 2405/08* (2013.01); *C08J 2479/02* (2013.01); *D06M 2101/06* (2013.01); *D06M 2200/30* (2013.01)

(56) References Cited

U.S. PATENT DOCUMENTS

| | | | |
|---|---|---|---|
| 8,608,990 B1 | 12/2013 | Zeng et al. | |
| 9,540,763 B2* | 1/2017 | Grunlan | C09D 5/18 |
| 2010/0297446 A1* | 11/2010 | Oxley | B01J 13/22 |
| | | | 428/402.2 |
| 2012/0295031 A1* | 11/2012 | Grunlan | C09D 7/61 |
| | | | 427/407.2 |

OTHER PUBLICATIONS

International Search Report and Written Opinion for PCT/US2015/022919 dated Jun. 30, 2015.

International Search Report and Written Opinion for Application No. PCT/US2015/022919 dated Jun. 30, 2015.

* cited by examiner

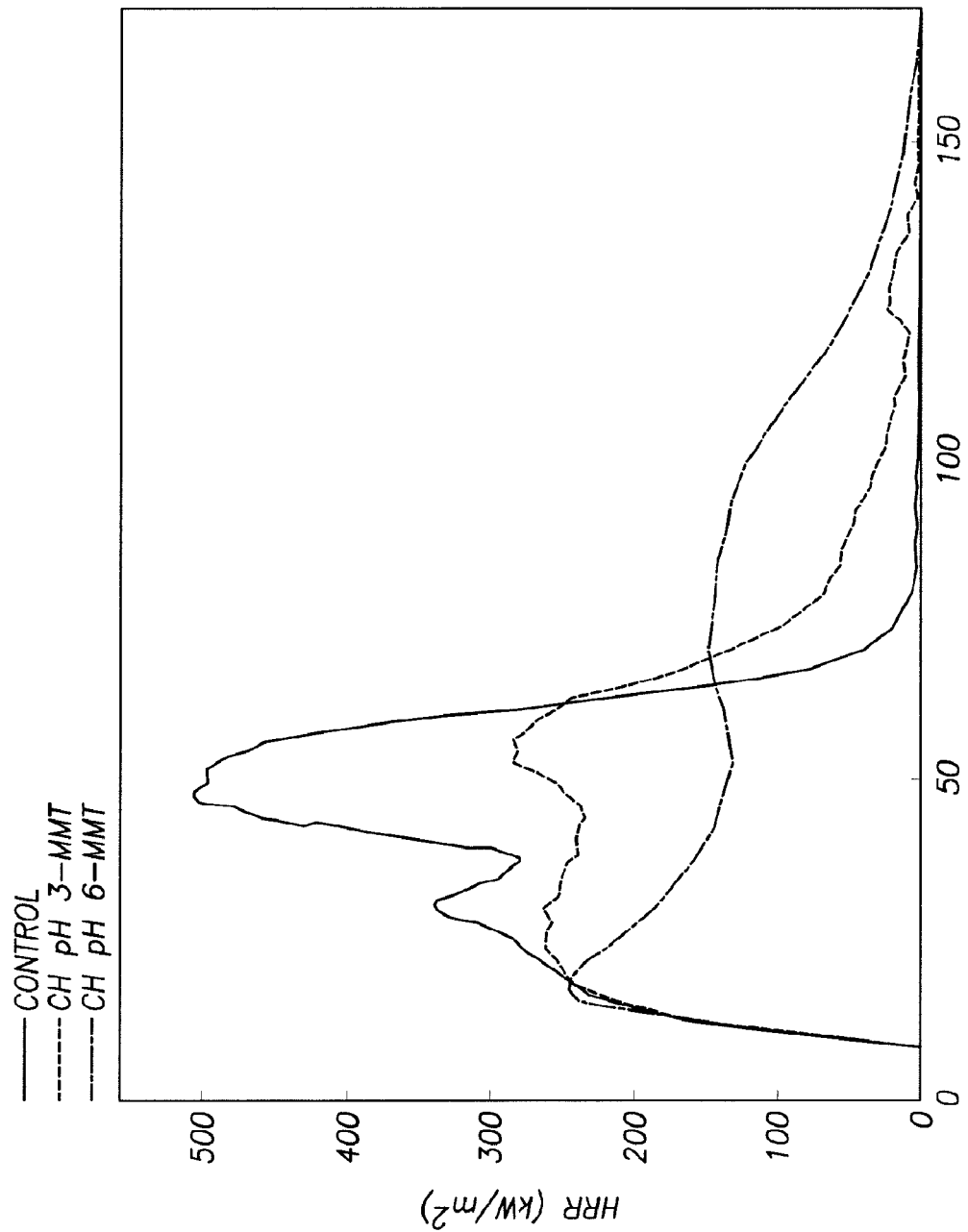

US 10,343,185 B2

FLAME RETARDANT NANOCOATED SUBSTRATE

BACKGROUND OF THE INVENTION

Field of the Invention

This invention relates to the field of coatings and more specifically to the field of flame retardant coatings for substrates of foam or fabric.

Background of the Invention

Fire-related occurrences have caused widespread property damage and injuries. It is well known that a wide range of commonly used materials are flammable. To reduce the hazards from such flammable materials, flame retardants have been developed. Such flame retardants include halogenated materials. Halogenated materials typically include brominated compounds and phosphinated compounds. Drawbacks to such halogenated materials include the potential for harm to the environment and humans. For instance, such halogenated materials may form toxins. Other drawbacks include a lack of durability that may be typical in some instances to the brominated compounds.

The use of nanoparticles has been developed to overcome such drawbacks. However, drawbacks to use of nanoparticles include increased processing viscosity and modulus of the final polymer material, such as foam or fabric. Further drawbacks include inadequate flame suppression and melt-dripping.

Layer by layer assembly has been developed to overcome such drawbacks. However, conventional layer by layer methods have drawbacks. Drawbacks include increasing stiffness of the fabric by worsening the hand (i.e., feel) of the fabric. Such drawbacks may be due to bridges between individual fibers in the fabric and/or depositing aggregates during the layering process.

Consequently, there is a need for an improved fire retardant polymer material. There is a further need for improved fire retardant coatings for foam, fabric and other substrate materials.

BRIEF SUMMARY OF SOME OF THE PREFERRED EMBODIMENTS

In an embodiment, these and other needs in the art are addressed by a method for coating a substrate to provide a flame resistant substrate. The method includes exposing the substrate to a cationic solution to produce a cationic layer deposited on the substrate. The cationic solution comprises cationic materials. The cationic materials comprise a polymer, a colloidal particle, a nanoparticle, a nitrogen-rich molecule, a geopolymer, a carbon-based filler, or any combinations thereof. The method further includes agitating the substrate. In addition, the method includes exposing the cationic layer to an anionic solution to produce an anionic layer deposited on the cationic layer to produce a layer comprising the anionic layer and the cationic layer. The anionic solution comprises a layerable material.

In embodiments, these and other needs in the art are addressed by a method for coating a substrate to provide a flame resistant substrate. The method includes exposing the substrate to an anionic solution to produce an anionic layer deposited on the substrate. The anionic solution comprises a layerable material. The method further includes agitating the substrate. In addition, the method includes exposing the anionic layer to a cationic solution to produce a cationic layer deposited on the anionic layer to produce a layer comprising the anionic layer and the cationic layer. The cationic solution comprises cationic materials. The cationic materials comprise a polymer, a colloidal particle, a nanoparticle, a nitrogen-rich molecule, a geopolymer, a carbon-based filler, or any combinations thereof.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 17 illustrates heat-release rate as a function of time;

DETAILED DESCRIPTION OF THE PREFERRED EMBODIMENTS

Figure 1:
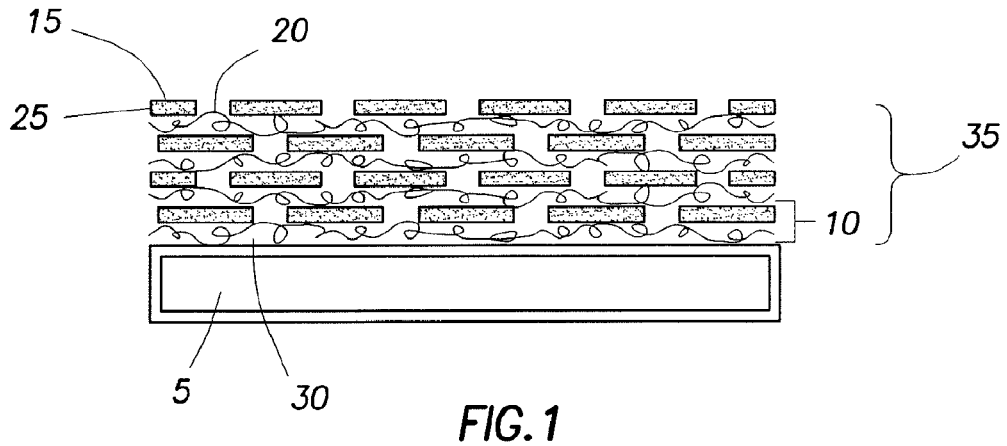
FIG. 1 illustrates a coated substrate embodiment.

In an embodiment, a multilayer thin film coating method provides a substrate with a coating by alternately depositing positive and negative charged layers on the substrate. The coating may provide flame retardancy (i.e., fire retardant coating), antimicrobial properties, antistatic properties and other properties to a substrate. Each pair of positive and negative layers comprises a layer. In embodiments, the multilayer thin film coating method produces any number of desired layers on substrates such as bilayers, trilayers, quadlayers, pentalayers, and the like. The positive and negative layers may have any desired thickness. In embodiments, each layer is between about 0.5 nanometers and about 100 nanometers thick, alternatively between about 1 nanometer and about 100 nanometers thick, and further alternatively between about 0.5 nanometers and about 10 nanometers thick.

Any desirable substrate may be coated with the multilayer thin film coating method. In embodiments, the substrate includes foam, rubber, fabric, leather, vinyl compounds, plastic, glass, ceramic, metal, wood, carpet, hook and loop fasteners, non-foam padding, lapis, ducts, or any combinations thereof. Any desirable foam may be used as the substrate. Without limitation, examples of suitable foams include polyurethane foam and polystyrene foam. Any desirable rubber may be used as the substrate. Without limitation, examples of suitable rubbers include natural rubber and synthetic rubber. In an embodiment, the substrate is fabric. The fabric used may include any desirable type of fabric. Without limitation, examples of suitable fabric include cotton, wool, linen, acrylic fiber, polyethylene, rattan, coir, sisal, flax, hemp, silk, nylon, polyester, polyamide, olefins, or any combinations thereof. In an embodiment, the substrate includes hook and loop fasteners (i.e., VELCRO®, which is a registered trademark of Velcro Industries, B.V.). In some embodiments, the substrate is a carpet or the like. It is to be understood that a carpet refers to a woven floor covering having an upper pile layer attached to a backing. In an embodiment, the substrate is a duct or a system of ducts (e.g., ductwork). In some embodiments, the substrate is wood. In embodiments, the wood includes wood products such as particle board. Without limitation, an example of wood is balsa wood. Non-foam padding refers to material that provides cushion against contact and that does not include foam. Without limitation, examples of non-foam padding include cotton, feathers, and the like.

The negative charged (anionic) layers comprise layerable materials. The layerable materials include anionic polymers, colloidal particles, phosphated molecules, sulfated molecules, boron-containing polymers, carbon-based fillers, or any combinations thereof. Without limitation, examples of suitable anionic polymers include branched polystyrene sulfonate (PSS), polymethacrylic acid (PMAA), polyacrylic acid (PAA), polymers with hydrogen bonding, polyethylenimine, poly (acrylic acid, sodium salt), polyanetholesulfonic acid sodium salt, poly(vinylsulfonic acid, sodium salt), or any combinations thereof. In addition, without limitation, colloidal particles include organic and/or inorganic materials. Further, without limitation, examples of colloidal particles include clays, colloidal silica, inorganic hydroxides, silicon based polymers, polyoligomeric silsesquioxane, carbon nanotubes, graphene, or any combinations thereof. Any type of clay suitable for use in an anionic solution may be used. Without limitation, examples of suitable clays include sodium montmorillonite, hectorite, saponite, Wyoming bentonite, halloysite, vermiculite, or any combinations thereof. In an embodiment, the clay is sodium montmorillonite. Any inorganic hydroxide that may provide flame retardancy may be used. In an embodiment, the inorganic hydroxide includes aluminum hydroxide, magnesium hydroxide, or any combinations thereof. Phosphated molecules refer to molecules with a phosphate ion. Examples of suitable phosphate molecules include polysodium phosphate, ammonium phosphate, ammonium polyphosphate (APP), sodium hexametaphosphate, polyethylene glycol sulfate, poly vinyl sulfonic acid, or any combinations thereof. Sulfated molecules refer to molecules with a sulfate ion. Examples of suitable sulfated molecules include ammonium sulfate, sodium sulfate, or any combinations thereof. Any boron-containing polymer suitable for use in an anionic layer may be used. Examples of suitable boron-containing polymers include boronates, boronic acids, boronic containing acids, or any combinations thereof. In an embodiment, the boronic acid is 2-methylpropylboronic acid, 2-hydroxy-3-methylphenyl boronic acid, polymer-bound boronic acid, or any combinations thereof. Any boron containing acid suitable for use in an anionic layer may be used. In an embodiment, the boron containing acid is boric acid. In embodiments, any salt suitable for use in an anionic layer may be used. In embodiments, anionic materials may include a phosphate-rich salt, a sulfate-rich salt, or any combinations thereof. In alternative embodiments, layerable materials are neutral. The carbon-based fillers may include any suitable carbon-based filler suitable for use in an anionic solution. Without limitation, examples of carbon-based fillers include carbon nanofibers, carbon nanotubes, carbon black, graphene, graphene oxide, or any combinations thereof.

The positive charge (cationic) layers comprise cationic materials. The cationic materials comprise polymers, colloidal particles, nanoparticles, nitrogen-rich molecules, geopolymers, carbon-based fillers, or any combinations thereof. In some embodiments, the cationic materials comprise polymers, colloidal particles, nanoparticles, nitrogen-rich molecules, geopolymers, carbon-based fillers, metal ions, or any combinations thereof. The polymers include cationic polymers, polymers with hydrogen bonding, or any combinations thereof. Without limitation, examples of suitable cationic polymers include branched polyethylenimine (BPEI), cationic polyacrylamide, cationic poly diallyldimethylammonium chloride (PDDA), poly (melamine-co-formaldehyde), polymelamine, copolymers of polymelamine, polyvinylpyridine, copolymers of polyvinylpyridine, or any combinations thereof. Without limitation, examples of suitable polymers with hydrogen bonding include polyethylene oxide, polyallylamine, polypropylene oxide, poly (vinyl methyl ether), polyvinyl alcohol, polyvinylpyrrolidone, polyallylamine, branched polyethylenimine, linear polyethylenimine, poly (acrylic acid), poly (methacrylic acid), copolymers thereof, or any combinations thereof. In addition, without limitation, colloidal particles include organic and/or inorganic materials. Further, without limitation, examples of colloidal particles include chitosan, clays, layered double hydroxides (LDH), inorganic hydroxides, silicon based polymers, polyoligomeric silsesquioxane, carbon nanotubes, graphene, or any combinations thereof. Without limitation, examples of suitable layered double hydroxides include hydrotalcite, magnesium LDH, aluminum LDH, or any combinations thereof. Without limitation, an example of a nitrogen-rich molecule is melamine. In embodiments, cationic materials may include a phosphate-rich salt, a sulfate-rich salt, or any combinations thereof. In alternative embodiments, cationic materials are neutral. The carbon-based fillers may include any suitable carbon-based filler suitable for use in an anionic solution. Without limitation, examples of carbon-based fillers include carbon nanofibers, carbon nanotubes, carbon black, graphene, graphene oxide, or any combinations thereof.

In embodiments, the positive and negative layers are deposited on the substrate by any suitable method. Without limitation, examples of suitable methods include bath, spray, spin coating, screen printing, or any combinations thereof. In an embodiment, the positive and negative layers are deposited by bath (i.e., dip).

In embodiments, the substrate is agitated. In embodiments, the agitation (i.e., ultrasonication) may be while the substrate (i.e., fabric) is disposed in the aqueous solution (i.e., in a bath). In other embodiments, the agitation (i.e., ulrasonication) may be while the substrate (i.e., fabric) is disposed in a rinse step. In some embodiments, the agitation (i.e., ultrasonication) may be while the substrate (i.e., fabric) is disposed in the aqueous solution and also when in a rinse step. Any suitable form of agitation may be used. For instance, agitation may include use of a mechanical agitator and/or ultrasonication. In some embodiments, the agitation includes simple stirring. In an embodiment, the agitation is of sufficient strength to break bridges of the substrate (i.e., break bridges between individual fibers). Agitation may be for any sufficient period of time to break such bonds. Without limitation, such periods of time include from about 0.1 seconds to about 10 minutes, alternatively from about 1 second to about 10 minutes, and alternatively from about 10 second to about 1 minute. The ultrasonication comprises a frequency from about 50 kHz to about 130 kHz, alternatively from about 20 kHz to about 300 kHz. Ultrasonication may be by any suitable method or any suitable ultrasonicator. In an embodiment, the ultrasonication is accomplished by a bath sonicator, coil sonicator, or any combination thereof. In some embodiments, a rinse bath is replaced by a bath sonicator (i.e., of an about equivalent sized bath sonicator). In embodiments, a coil sonicator is attached to a rinse bath (i.e., large bath). Any suitable mechanical agitator for the desired agitation may be used such as a stirring paddle. Without being limited by theory, agitation (i.e., ultrasonication) may reduce the frequency of the polymer linkages and aggregates without reducing efficacy of the coating. The multilayer thin film coating method with agitation (i.e., ultrasonication) provides a coated substrate (i.e., coated fabric) that may be self-extinguishing due to a flame retardant intumescent effect. Further, without limitation, not only does agitation (i.e., ultrasonication rinse steps) improve the hand of the coated substrate, the agitation may also improve the consistency of the flame retardant behavior and may also improve the combustion behavior as measured by microcone calorimetry.

FIG. 1 illustrates an embodiment of a substrate 5 with a coating 35 of multiple bilayers 10. In an embodiment to produce the coated substrate 5 shown in FIG. 1, the multilayer thin film coating method includes exposing substrate 5 to cationic molecules in a cationic mixture to produce cationic layer 30 on substrate 5. The cationic mixture contains cationic materials 20. In such an embodiment, the substrate 5 is negatively charged or neutral. The cationic mixture includes an aqueous solution of the cationic materials 20. The aqueous solution may be prepared by any suitable method. In embodiments, the aqueous solution includes the cationic materials 20 and water. In other embodiments, cationic materials 20 may be dissolved in a mixed solvent, in which one of the solvents is water and the other solvent is miscible with water (e.g., water, methanol, ionic liquids, polyionic liquids, and the like). In alternative embodiments, the solvent does not include water. The solution may also contain colloidal particles in combination with polymers or alone, if positively charged. Any suitable water may be used. In embodiments, the water is deionized water. In some embodiments, the aqueous solution may include from about 0.05 wt. % cationic materials 20 to about 1.50 wt. % cationic materials 20, alternatively from about 0.01 wt. % cationic materials 20 to about 1.00 wt. % cationic materials 20. In embodiments, the substrate 5 may be exposed to the cationic mixture for any suitable period of time to produce the cationic layer 30. In embodiments, the substrate 5 is exposed to the cationic mixture from about 1 second to about 20 minutes, alternatively from about 1 second to about 200 seconds, and alternatively from about 10 seconds to about 200 seconds. Without being limited by theory, the exposure time of substrate 5 to the cationic mixture and the concentration of cationic materials 20 in the cationic mixture affect the thickness of the cationic layer 30. For instance, the higher the concentration of the cationic materials 20 and the longer the exposure time, the thicker the cationic layer 30 produced by the multilayer thin film coating method.

In embodiments, after formation of cationic layer 30, the multilayer thin film coating method includes removing substrate 5 with the produced cationic layer 30 from the cationic mixture and then exposing substrate 5 with cationic layer 30 to anionic molecules in an anionic mixture to produce anionic layer 25 on cationic layer 30 and thereby form bilayer 10. The anionic mixture contains the layerable materials 15. Without being limited by theory, the positive cationic layer 30 attracts the anionic molecules to form the cationic-anionic pair of bilayer 10. The anionic mixture includes an aqueous solution of the layerable materials 15. The aqueous solution may be prepared by any suitable method. In embodiments, the aqueous solution includes the layerable materials 15 and water. Layerable materials 15 may also be dissolved in a mixed solvent, in which one of the solvents is water and the other solvent is miscible with water (e.g., ethanol, methanol, ionic liquids, polyionic liquids, and the like). In alternative embodiments, the solvent does not include water. Combinations of anionic polymers and colloidal particles may be present in the aqueous solution. Any suitable water may be used. In embodiments, the water is deionized water. In some embodiments, the aqueous solution may include from about 0.05 wt. % layerable materials 15 to about 1.50 wt. % layerable materials 15, alternatively from about 0.01 wt. % layerable materials 15 to about 1.00 wt. % layerable materials 15. In embodiments, substrate 5 with cationic layer 30 may be exposed to the anionic mixture for any suitable period of time to produce anionic layer 25. In embodiments, substrate 5 with cationic layer 30 is exposed to the anionic mixture from about 1 second to about 20 minutes, alternatively from about 1 second to about 200 seconds, and alternatively from about 10 seconds to about 200 seconds. Without being limited by theory, the exposure time of substrate 5 with cationic layer 30 to the anionic mixture and the concentration of layerable materials 15 in the anionic mixture affect the thickness of anionic layer 25. For instance, the higher the concentration of the layerable materials 15 and the longer the exposure time, the thicker the anionic layer 25 produced by the multilayer thin film coating method. Substrate 5 with bilayer 10 is then removed from the anionic mixture. In embodiments, the exposure steps are repeated with substrate 5 having bilayer 10 continuously exposed to the cationic mixture and then the anionic mixture to produce multiple bilayers 10 as shown in FIG. 1. The repeated exposure to the cationic mixture and then the anionic mixture may continue until the desired number of bilayers 10 is produced. It is to be understood that the same method is used to produce trilayers, quadlayers, and the like.

Figure 18:
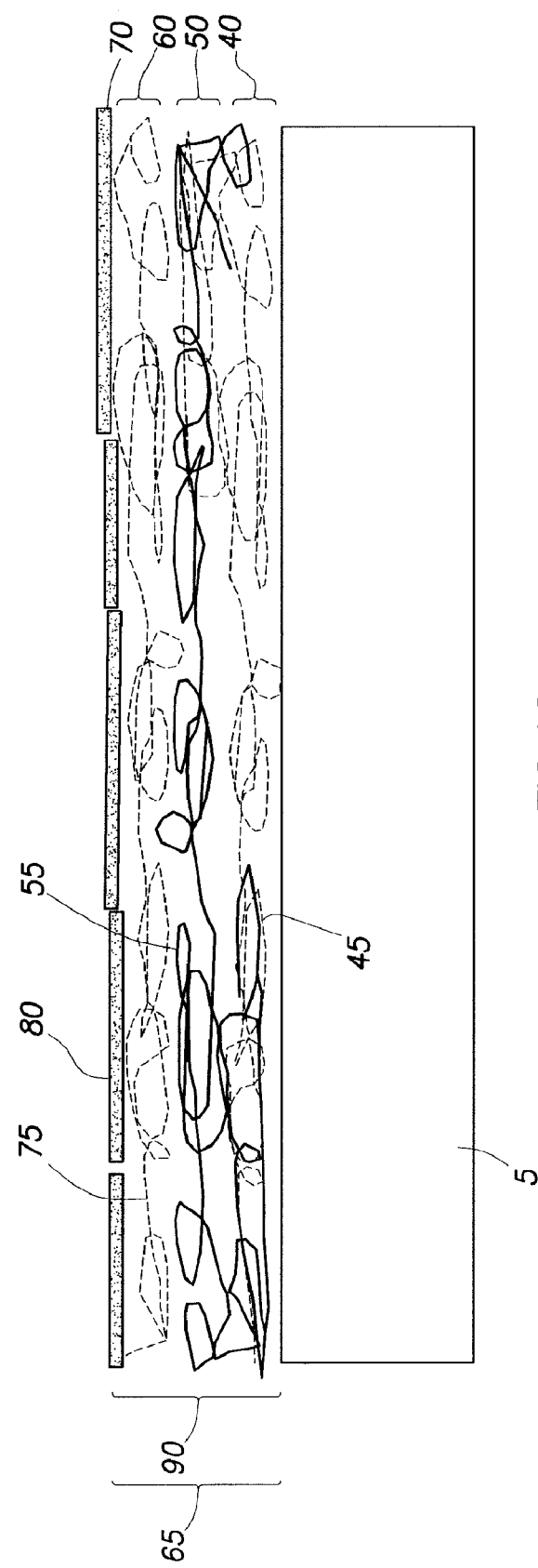
FIG. 18 illustrates an embodiment of a coating with a quadlayer.

FIG. 18 illustrates an embodiment of substrate 5 with coating 65 of quadlayer 90. In an embodiment to produce the coated substrate 5 shown in FIG. 18, the multilayer thin film coating method includes exposing substrate 5 to cationic molecules in a cationic mixture to produce first cationic layer 40 on rubber substrate 5. The cationic mixture contains first layer cationic materials 45. In an embodiment, first layer cationic materials 45 are positively charged or neutral. In embodiments, first layer cationic materials 45 are neutral. In some embodiments, first layer cationic materials 45 includes branched polyethylenimine. In such an embodiment, substrate 5 is negatively charged or neutral. Embodiments include substrate 5 having a negative charge. Without limitation, a negatively charged substrate 5 provides a desired adhesion. The cationic mixture includes an aqueous solution of first layer cationic materials 45. The aqueous solution may be prepared by any suitable method. In embodiments, the aqueous solution includes first layer cationic materials 45 and water. In other embodiments, first layer cationic materials 45 may be dissolved in a mixed solvent, in which one of the solvents is water, and the other solvent is miscible with water (e.g., water, methanol, and the like). The solution may also contain colloidal particles in combination with polymers or alone, if positively charged. Any suitable water may be used. In embodiments, the water is deionized water. In some embodiments, the aqueous solution may include from about 0.05 wt. % first layer cationic materials 45 to about 1.50 wt. % first layer cationic materials 45, alternatively from about 0.01 wt. % first layer cationic materials 45 to about 2.00 wt. % first layer cationic materials 45, and further alternatively from about 0.001 wt. % first layer cationic materials 45 to about 20.0 wt. % first layer cationic materials 45. In embodiments, substrate 5 may be exposed to the cationic mixture for any suitable period of time to produce first cationic layer 40. In embodiments, the substrate 5 is exposed to the cationic mixture from about 1 second to about 20 minutes, alternatively from about 1 second to about 200 seconds, and alternatively from about 10 seconds to about 200 seconds. In an embodiment, the aqueous solution is agitated.

In embodiments, after formation of first cationic layer 40, multilayer thin film coating method includes removing substrate 5 with the produced first cationic layer 40 from the cationic mixture and then exposing substrate 5 with first cationic layer 40 to anionic molecules in an anionic mixture to produce first anionic layer 50 on first cationic layer 40. The anionic mixture contains first layer layerable materials 55. Without limitation, the positive or neutral first cationic layer 40 attracts the anionic molecules to form the cationic (or neutral)-anionic pair of first cationic layer 40 and first anionic layer 50. The anionic mixture includes an aqueous solution of first layer layerable materials 55. In an embodiment, first layer layerable materials 55 comprise polyacrylic acid. The aqueous solution may be prepared by any suitable method. In embodiments, the aqueous solution includes first layer layerable materials 55 and water. First layer layerable materials 55 may also be dissolved in a mixed solvent, in which one of the solvents is water and the other solvent is miscible with water (e.g., ethanol, methanol, and the like). Combinations of anionic polymers and colloidal particles may be present in the aqueous solution. Any suitable water may be used. In embodiments, the water is deionized water. In some embodiments, the aqueous solution may include from about 0.05 wt. % first layer layerable materials 55 to about 1.50 wt. % first layer layerable materials 55, alternatively from about 0.01 wt. % first layer layerable materials 55 to about 2.00 wt. % first layer layerable materials 55, and further alternatively from about 0.001 wt. % first layer layerable materials 55 to about 20.0 wt. % first layer layerable materials 55. In embodiments, substrate 5 with first cationic layer 40 may be exposed to the anionic mixture for any suitable period of time to produce first anionic layer 50. In embodiments, substrate 5 with first cationic layer 40 is exposed to the anionic mixture from about 1 second to about 20 minutes, alternatively from about 1 second to about 200 seconds, and alternatively from about 10 seconds to about 200 seconds. In embodiments, the aqueous solution is agitated.

In embodiments as further shown in FIG. 18, after formation of first anionic layer 50, the multilayer thin film coating method includes removing substrate 5 with the produced first cationic layer 40 and first anionic layer 50 from the anionic mixture and then exposing substrate 5 with first cationic layer 40 and first anionic layer 50 to cationic molecules in a cationic mixture to produce second cationic layer 60 on first anionic layer 50. The cationic mixture contains second layer cationic materials 75. In an embodiment, second layer cationic materials 75 are positively charged or neutral. In embodiments, second layer cationic materials 75 are positive. In some embodiments, second layer cationic materials 75 comprise BPEI. The cationic mixture includes an aqueous solution of second layer cationic materials 75. The aqueous solution may be prepared by any suitable method. In embodiments, the aqueous solution includes second layer cationic materials 75 and water. In other embodiments, second layer cationic materials 75 may be dissolved in a mixed solvent, in which one of the solvents is water and the other solvent is miscible with water (e.g., water, methanol, and the like). The solution may also contain colloidal particles in combination with polymers or alone, if positively charged. Any suitable water may be used. In embodiments, the water is deionized water. In some embodiments, the aqueous solution may include from about 0.05 wt. % second layer cationic materials 75 to about 1.50 wt. % second layer cationic materials 75, alternatively from about 0.01 wt. % second layer cationic materials 75 to about 2.00 wt. % second layer cationic materials 75, and further alternatively from about 0.001 wt. % second layer cationic materials 75 to about 20.0 wt. % second layer cationic materials 75. In embodiments, substrate 5 may be exposed to the cationic mixture for any suitable period of time to produce second cationic layer 60. In embodiments, substrate 5 with first cationic layer 40 and first anionic layer 50 is exposed to the cationic mixture from about 1 second to about 20 minutes, alternatively from about 1 second to about 200 seconds, and alternatively from above about 10 seconds to about 200 seconds. In embodiments, the aqueous solution is agitated.

In embodiments, after formation of the second cationic layer 60, multilayer thin film coating method includes removing substrate 5 with the produced first cationic layer 40, first anionic layer 50, and second cationic layer 60 from the cationic mixture and then exposing substrate 5 with first cationic layer 40, first anionic layer 50, and second cationic layer 60 to anionic molecules in an anionic mixture to produce second anionic layer 70 on second cationic layer 60. The anionic mixture contains second layer layerable materials 80. Without limitation, the positive or neutral second cationic layer 60 attracts the anionic molecules to form the cationic (or neutral)-anionic pair of second cationic layer 60 and second anionic layer 70. The anionic mixture includes an aqueous solution of second layer layerable materials 80. In an embodiment, second layer layerable materials 80 comprise clay. Embodiments include the clay comprising sodium montmorillonite. The aqueous solution may be prepared by any suitable method. In embodiments, the aqueous solution includes second layer layerable materials 80 and water. Second layer layerable materials 80 may also be dissolved in a mixed solvent, in which one of the solvents is water and the other solvent is miscible with water (e.g., ethanol, methanol, and the like). Combinations of anionic polymers and colloidal particles may be present in the aqueous solution. Any suitable water may be used. In embodiments, the water is deionized water. In some embodiments, the aqueous solution may include from about 0.05 wt. % second layer layerable materials 80 to about 1.50 wt. % second layer layerable materials 80, alternatively from about 0.01 wt. % second layer layerable materials 80 to about 2.00 wt. % second layer layerable materials 80, and further alternatively from about 0.001 wt. % second layer layerable materials 80 to about 20.0 wt. % second layer layerable materials 80. In embodiments, substrate 5 with first cationic layer 40, first anionic layer 50, and second cationic layer 60 may be exposed to the anionic mixture for any suitable period of time to produce second anionic layer 70. In embodiments, substrate 5 with first cationic layer 40, first anionic layer 50, and second cationic layer 60 is exposed to the anionic mixture from about 1 second to about 20 minutes, alternatively from about 1 second to about 200 seconds, and alternatively from about 10 seconds to about 200 seconds. Quadlayer 90 is therefore produced on substrate 5. In embodiments as shown in FIG. 18 in which substrate 5 has one quadlayer 90, coating 65 comprises quadlayer 90. In embodiments, quadlayer 90 comprises first cationic layer 40, first anionic layer 50, second cationic layer 60, and second anionic layer 70. A cycle of the multilayer thin film coating method produces one quadlayer 90. To produce a second quadlayer on substrate 5, a second cycle is accomplished.

Figure 19:
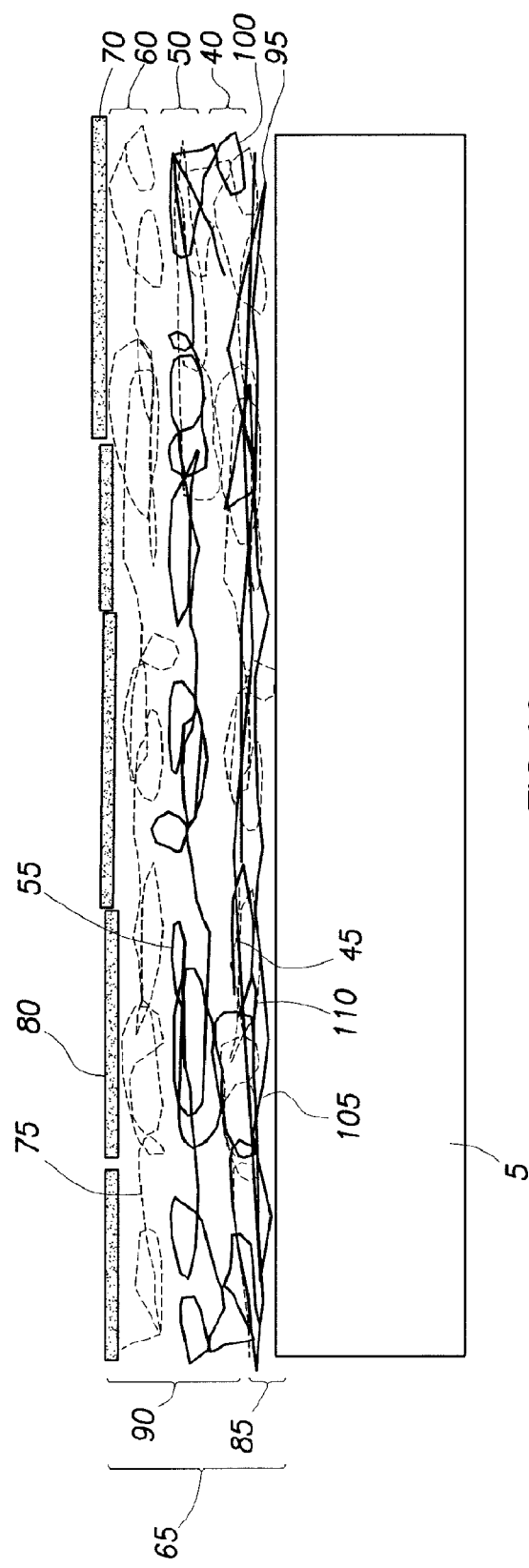
FIG. 19 illustrates an embodiment of a coating with a quadlayer and a primer layer on a substrate.

In an embodiment as shown in FIG. 19, coating 65 also comprises primer layer 85. Primer layer 85 is disposed between substrate 5 and first cationic layer 40 of quadlayer 90. Primer layer 85 may have any number of layers. The layer of primer layer 85 proximate to substrate 5 has a charge with an attraction to substrate 5, and the layer of primer layer 85 proximate to first cationic layer 40 has a charge with an attraction to first cationic layer 40. In embodiments as shown in FIG. 19, primer layer 85 is a bilayer having a first primer layer 95 and a second primer layer 100. In such embodiments, first primer layer 95 is a cationic layer (or alternatively neutral) comprising first primer layer materials 105, and second primer layer 100 is an anionic layer comprising second primer layer materials 110. First primer layer materials 105 comprise cationic materials. In an embodiment, first primer layer materials 105 comprise polyethylenimine. Second primer layer materials 110 comprise layerable materials. In an embodiment, second primer layer materials 110 comprise polyacrylic acid. In other embodiments (not shown), primer layer 85 has more than one bilayer.

It is to be understood that the multilayer thin film coating method is not limited to exposure to a cationic mixture followed by an anionic mixture. In embodiments in which substrate 5 is positively charged, the multilayer thin film coating method includes exposing substrate 5 to the anionic mixture followed by exposure to the cationic mixture. In such embodiment (not illustrated), anionic layer 25 is deposited on substrate 5 with cationic layer 30 deposited on anionic layer 25 to produce bilayer 10 with the steps repeated until coating 35 has the desired thickness. In embodiments in which substrate 5 has a neutral charge, the multilayer thin film coating method may include beginning with exposure to the cationic mixture followed by exposure to the anionic mixture or may include beginning with exposure to the anionic mixture followed by exposure to the cationic mixture.

Figure 2:
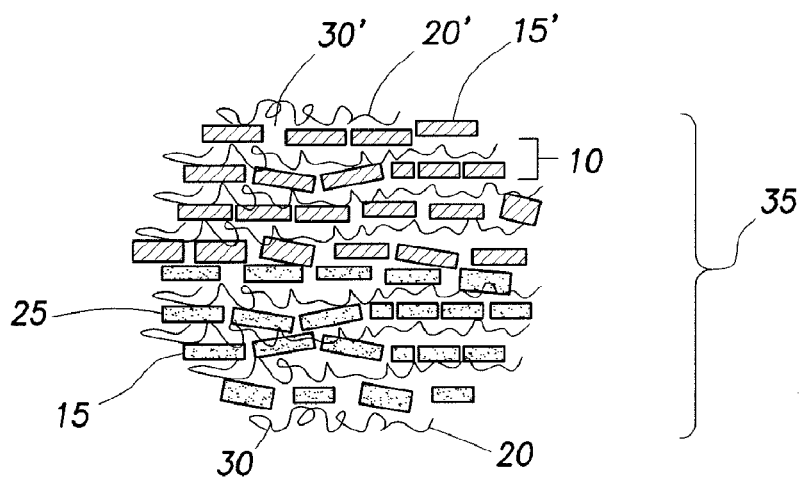
FIG. 2 illustrates an embodiment with bilayers of layerable materials and additives.
Figure 3:
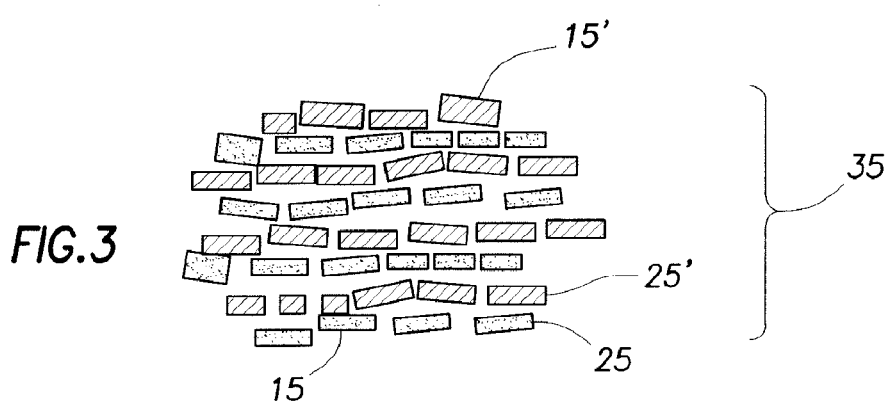
FIG. 3 illustrates an embodiment with alternating layers of layerable materials and additives.
Figure 4:
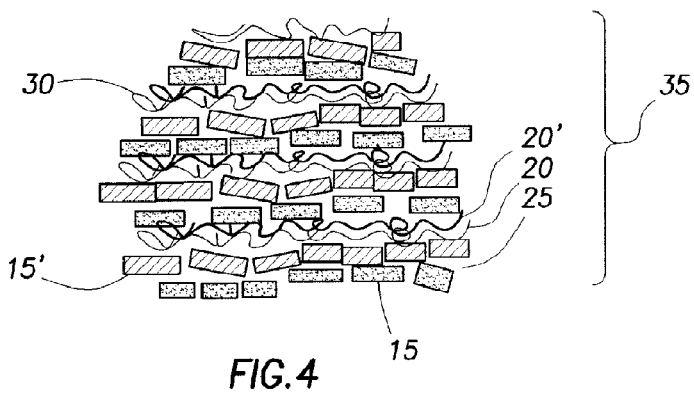
FIG. 4 illustrates an embodiment with bilayers of layerable materials and additives.

It is to be further understood that coating 35 is not limited to one layerable material 15 but may include more than one layerable material 15 and/or more than one cationic material 20. The different layerable materials 15 may be disposed on the same anionic layer 25, alternating anionic layers 25, or in layers of bilayers 10, layers of quadlayers 90, layers of trilayers, and the like. The different cationic materials 20 may be dispersed on the same cationic layer 30 or in alternating cationic layers 30. For instance, in embodiments as illustrated in FIGS. 2-4, coating 35 includes two types of layerable materials 15, 15' (i.e., sodium montmorillonite is layerable material 15 and aluminum hydroxide is layerable material 15'). It is to be understood that substrate 5 is not shown for illustrative purposes only in FIGS. 2-4. FIG. 2 illustrates an embodiment in which layerable materials 15, 15' are in different layers of bilayers 10. For instance, as shown in FIG. 2, layerable materials 15' are deposited in the top bilayers 10 after layerable materials 15 are deposited on substrate 5 (not illustrated). FIG. 3 illustrates an embodiment in which coating 35 has layerable materials 15, 15' in alternating bilayers. It is to be understood that cationic materials 20 are not shown for illustrative purposes only in FIG. 3. FIG. 4 illustrates an embodiment in which there are two types of bilayers 10, comprised of particles (layerable materials 15, 15') and cationic materials 20, 20' (e.g., polymers).

In some embodiments, the multilayer thin film coating method includes rinsing substrate 5 between each exposure step (i.e., step of exposing to cationic mixture or step of exposing to anionic mixture). For instance, after substrate 5 is removed from exposure to the cationic mixture, substrate 5 with cationic layer 30 is rinsed and then exposed to an anionic mixture. After exposure to the anionic mixture, substrate 5 with bilayer 10, trilayer, quadlayer 90 or the like is rinsed before exposure to the same or another cationic mixture. The rinsing is accomplished by any rinsing liquid suitable for removing all or a portion of ionic liquid from substrate 5 and any layer. In embodiments, the rinsing liquid includes deionized water, methanol, or any combinations thereof. In an embodiment, the rinsing liquid is deionized water. Substrate 5 may be rinsed for any suitable period of time to remove all or a portion of the ionic liquid. In an embodiment, substrate 5 is rinsed for a period of time from about 5 seconds to about 5 minutes. In some embodiments, substrate 5 is rinsed after a portion of the exposure steps.

In embodiments, the multilayer thin film coating method includes drying substrate 5 between each exposure step (i.e., step of exposing to cationic mixture or step of exposing to anionic mixture). For instance, after substrate 5 is removed from exposure to the cationic mixture, substrate 5 with cationic layer 30 is dried and then exposed to an anionic mixture. After exposure to the anionic mixture, substrate 5 with bilayer 10, trilayer, quadlayer 90, or the like is dried before exposure to the same or another cationic mixture. The drying is accomplished by applying a drying gas to substrate 5. The drying gas may include any gas suitable for removing all or a portion of liquid from substrate 5. In embodiments, the drying gas includes air, nitrogen, or any combinations thereof. In an embodiment, the drying gas is air. In some embodiments, the air is filtered air. Substrate 5 may be dried for any suitable period of time to remove all or a portion of the liquid. In an embodiment, substrate 5 is dried for a period of time from about 5 seconds to about 500 seconds. In an embodiment in which substrate 5 is rinsed after an exposure step, substrate 5 is dried after rinsing and before exposure to the next exposure step. In alternative embodiments, drying includes applying a heat source to substrate 5. For instance, in an embodiment, substrate 5 is disposed in an oven for a time sufficient to remove all or a portion of the liquid. In alternative embodiments, drying includes squeezing substrate 5 to wring the liquid out. In some embodiments, drying is not performed until all layers have been deposited, as a final step before use.

In some embodiments (not illustrated), additives may be added to substrate 5 in coating 35. In embodiments, the additives may be mixed in anionic mixtures with layerable materials 15. In other embodiments, the additives are disposed in anionic mixtures that do not include layerable materials 15. In some embodiments, coating 35 has a layer or layers of additives. In embodiments, the additives are anionic materials. The additives may be used for any desirable purpose. For instance, additives may be used for protection of substrate 5 against ultraviolet light or for abrasion resistance. For ultraviolet light protection, any negatively charged material suitable for protection against ultraviolet light and for use in coating 35 may be used. In an embodiment, examples of suitable additives for ultraviolet protection include titanium dioxide, or any combinations thereof. In embodiments, the additive is titanium dioxide. For abrasion resistance, any additive suitable for abrasion resistance and for use in coating 35 may be used. In embodiments, examples of suitable additives for abrasion resistance include crosslinkers. Crosslinkers may be any chemical that reacts with any matter in coating 35. Examples of crosslinkers include bromoalkanes, aldehydes, carbodiimides, amine active esters, or any combinations thereof. In embodiments, the aldehydes include glutaraldehyde. In an embodiment, the carbodiimide is 1-ethyl-3-(3-dimethylaminopropyl) carbodiimide (EDC). Embodiments include the amine reactive esters including N-hydroxysuccinimide esters, imidoesters, or any combinations thereof. The crosslinkers may be used to crosslink the anionic layers 25 and/or cationic layers 30. In an embodiment, substrate 5 with layers (i.e., bilayer 10, trilayer, quadlayer 90, or the like) is exposed to additives in an anionic mixture in the last exposure step (i.e., final bath or final spray step). In alternative embodiments, the additives may be added in an exposure step. Without limitation, crosslinking provides washability and durability to coating 35.

In some embodiments, the pH of anionic and/or cationic solution is adjusted. Without being limited by theory, reducing the pH of the cationic solution reduces growth of coating 35. Further, without being limited by theory, the coating 35 growth may be reduced because the cationic solution may have a high charge density at lowered pH values, which may cause the polymer backbone to repel itself into a flattened state. In some embodiments, the pH is increased to increase the coating 35 growth and produce a thicker coating 35. Without being limited by theory, a lower charge density in the cationic mixture provides an increased coiled polymer. The pH may be adjusted by any suitable means such as by adding an acid or base.

The exposure steps in the anionic and cationic mixtures may occur at any suitable temperature. In an embodiment, the exposure steps occur at ambient temperatures. In some embodiments, the fire retardant coating is optically transparent.

The layers may be in any desired configuration such as a trilayer disposed on a bilayer 10, a quadlayer 90 disposed on a trilayer that is disposed on a bilayer 10, and the like. In addition, in some embodiments, layerable materials 15 and/or cationic materials 20 in a layer (i.e., a bilayer 10) are different than layerable materials 15 and/or cationic materials 20 in a proximate layer (i.e., a quadlayer 90). Without being limited by theory, coatings 35 that have a layer with different layerable materials 15 and/or cationic materials 20 than a proximate layer may have a synergistic effect. Such synergistic effect may increase the flame retardancy of coating 35. For instance, in embodiments, a cationic layer 30 has layers that do not include clay but in one layer or other layers, clay is sued as the cationic material 20.

In some embodiments, the layers may be in a stacked configuration. The stacked configuration may include a stacking having a plurality of layers (i.e., of bilayers, trilayers, etc.) with each bilayer, trilayer, etc. having the same materials and then having another plurality of layers (i.e., of bilayers, trilayers, etc.) with each bilayer, trilayer, etc. having the same materials but a different material composition from the other stack. As many stacks as desired may be used. For instance, a stacking may include ten bilayers with each bilayer of about the same composition, and another stack of ten bilayers disposed on the first stack and having a different composition from the first stack.

Without being limited by theory, the fire retardant coating covers the internal walls of the pores of the substrate without blocking the pores. For instance, in an embodiment in which the substrate is a fabric comprising threads, the multilayer thin film coating method may individually coat each thread with the fire retardant coating. Further, without being limited by theory, coating each thread provides flame retardancy to the substrate but allows the threads to remain soft and flexible.

In embodiments, the multilayer thin film coating method comprising the agitation step (i.e., ultrasonication) provides a means for softer, less stiff substrates (i.e., fabric). The substrates coated using the multilayer thin film coating method comprising the agitation step may be antistatic, antimicrobial, flame resistant, and the like and include environmentally friendly and non-toxic processes. Such multilayer thin film coating method comprising the agitation step may provide effective flame retardant fabric with a soft hand with minimal to no additional processing, which may be desired for a variety of garments such as military uniforms. Further, without limitation, the ability to apply such nanocoatings without the linkages (i.e., bridging) between fibers may offer improved comfort.

To further illustrate various illustrative embodiments of the present invention, the following examples are provided.

EXAMPLES

Example 1

Preparation of Deposition Mixtures.

Cationic deposition solutions were prepared by dissolving 0.1 wt. % branched polyethylenimine, with a molecular weight of 25,000 g/mol (commercially available from Aldrich of Milwaukee, Wis., into 18.2 MΩ deionized water from a Direct-QTM 5 Ultrapure Water System (commercially available from Millipore of Billerica, Mass.). The unadjusted pH of this solution was 10.3, but this value was adjusted to 7 and 10 by adding IM hydrochloric acid (36.5-38.0% HCl available from Mallinckrodt Chemicals of Phillipsburg, N.J.). Sodium montmorillonite (MMT) (Cloisite® $Na^+$ a trademark of Southern Clay Products, Inc. of Gonzales, Tex.) was exfoliated by adding it to deionized water (0.2 or 1.0 wt. %) and slowly rolling for 24 h, to produce the anionic deposition mixtures. MMT had a cationic exchange capacity of 0.926 meq/g and a negative surface charge in deionized water. Individual platelets had a density of 2.86 g/cm$^3$, with a planar dimension of 10-1,000 nm (average was around 200 nm) and a thickness of 1 nm. The pH was measured with an Accumet® Basic AB15 pH meter (a registered trademark of Fisher Scientific Company).

Substrates.

Single-side-polished silicon wafers (commercially available from University Wafer of South Boston, Mass.) were used as deposition substrates for films characterized by ellipsometry and AFM. Polished Ti/Au crystals with a resonance frequency of 5 MHz were purchased from Maxtek. Inc. of Cypress, Calif. and used as deposition substrates for quartz crystal microbalance characterization. TEM imaging of these films used 125 μm polystyrene (PS) film (commercially available from Goodfellow of Oakdale, Pa.) as the substrate for deposition. Prior to deposition, silicon wafers were rinsed with acetone, then deionized water, and finally dried with filtered air. In the case of PS substrates, the film was rinsed with methanol and deionized water, and dried with air. The clean PS substrates were then corona-treated with a BD-20C Corona Treater (commercially available from Electro-Technic Products Inc. of Chicago, Ill.) for 2 minutes. Corona treatment oxidized the PS film surface and created a negative surface charge, which improved adhesion of the first BPEI layer. Scoured and bleached plain-woven cotton fabric, that was coated and tested for thermal stability, was supplied by the United States Department of Agriculture (USDA) Southern Regional Research Center (SRRC, New Orleans, La.). The fabric was a balanced weave with approximately 80 threads per inch in both the warp and fill direction, with a weight of 119 g/m$^2$. The control fabric was treated by laundering through a cold water cycle, with no detergent, in a standard commercial high-efficiency clothes washer and dried for approximately 30 minutes in a commercial electric clothes dryer (commercially available from Whirlpool Corporation of Benton Harbor, Mich.). The wet processing of the control fabric was intended to eliminate any changes in physical construction of the fabric due to the wet processing of the fabric during the LbL deposition and was then used as the uncoated fabric in all tests.

Layer-by-Layer Deposition.

All films were assembled on a given substrate. Each substrate was dipped into the ionic deposition solutions, alternating between the BPEI (cationic) and MMT (anionic), with each cycle corresponding to one bilayer. The first dip into each mixture was for five minutes, beginning with the cationic solution. Subsequent dips were for two minutes each. Every dip was followed by rinsing with deionized water and drying with a stream of filtered air for 30 seconds each. In the case of the fabrics, the drying step involved wringing the water out instead of air-drying. After achieving the desired number of bilayers, the coated wafers were dried with filtered air, whereas the fabrics were dried in an 80° C. oven for 2 hours.

Film Growth Characterization.

Film thickness was measured on silicon wafers using a PhE-101 Discrete Wavelength Ellipsometer (commercially available from Microphotonics of Allentown, Pa.). The HeNe laser (632.8 nm) was set at an incidence angle of 65°. A Maxtek Research Quartz Crystal Microbalance (QCM) from Infinicon of East Syracuse, N.Y. with a frequency range of 3.8-6 MHz, was used in con unction with 5 MHz quartz crystals to measure the weight per deposited layer. The crystal, in its holder, was dipped alternately into the positively and negatively-charged solutions. Between each dip, the crystal was rinsed, dried, and left on the microbalance for five minutes to stabilize. Cross-sections of the clay-polymer assemblies were imaged with a JEOL 1200 EX TEM (commercially available from Mitaka of Tokyo, Japan), operated at 110 kV. Samples were prepared for imaging by embedding a piece of PS supporting the LbL film in epoxy and sectioning it with a microtome equipped with a diamond knife. Surface structures were imaged with a Nanosurf EasyScan 2 Atomic Force Microscope (AFM) (commercially available from Nanoscience Instruments, Inc. of Phoenix, Ariz.). AFM images were gathered in tapping mode with a XYNCHR cantilever tip. A Bruker-AXS D8 Advanced Bragg-Brentano X-ray Powder Diffractometer (Cu Kα, λ=1.541λ) (commercially available from BRUKER AXS Inc. of Madison, Wis.) was used for both powder diffraction and glancing angle XRD. Contact angle measurements were done using a CAM 200 Optical Contact Angle Meter (commercially available from KSV Instruments Ltd. of Helsinki, Finland).

Thermal, Flammability, and Combustibility Testing.

All tests were conducted in triplicate for each system to obtain the reported averages. The thermal stability of uncoated and coated fabrics was measured in a Q50 Thermogravimetric Analyzer (commercially available from TA Instruments of New Castle, Del.). Each sample was approximately 20 mg and was tested in an air atmosphere, from room temperature to 600° C., with a heating rate of 20° C./min. Vertical flame testing was performed on 3×12 in. sections of uncoated and coated fabrics according to ASTM D6413. An Automatic Vertical Flammability Cabinet, model VC-2 (commercially available from Govmark of Farmingdale, N.Y.), was used to conduct this testing. The Bunsen burner flame, 19 mm below the fabric sample, was applied for twelve seconds, after which the after-flame and after-glow times were measured. Microscale combustibility experiments were carried out in a Govmark MCC-1 Microscale Combustion Calorimeter. The specimens were first kept at 100° C. for 5 min to remove adsorbed moisture, and then heated up to 700° C. at a heating rate of 1° C./sec, in a stream of nitrogen flowing at 80 cm$^3$/min. The pyrolysis volatiles released from the thermal degradation of the sample into the nitrogen gas stream were mixed with a 20 cm$^3$/min stream of pure oxygen prior to entering a 1000° ° C. combustion furnace. Three samples weighing about 43 mg were tested for each system.

Analysis of Fabric.

Surface images of control and coated fabrics, as well as afterburn chars (after direct exposure to flame), were acquired with a Quanta 600 FE-SEM (commercially available from FEI Company of Hillsboro, Oreg.). Physical properties of the fabric were tested at USDA-SRRC using ASTM and AATCC (American Association of Textile Chemists and Colorists) Standards. ASTM D 3775 was used to determine the fabric count on the fabric sample, counting the number of yarns in the warp and fill directions at five different locations to determine the average number of yarns per inch. ASTM D 1424 was used to determine the fabric's resistance to tearing. This test was carried out using the Elmendorf falling pendulum apparatus (commercially available from SDL Atlas of Stockport, UK). Two clamps secured the sample and a slit was cut down the center before a pendulum action attempted to tear the fabric. Control samples were tested five times, and coated samples were tested three times due to insufficient material to allow for five test specimens. ASTM D 5035 was used to determine the breaking force and percent of apparent elongation. A sample piece of fabric was placed in a constant-rate-of-extension tensile testing machine, and a force was applied until the sample broke (commercially available from Instron Corporation of Norwood, Mass.). As with the Elmendorf test, control samples were tested five times, and coated samples were tested three times. To determine water-wicking ability, the AATCC Committee RA63 proposed test method for wicking was employed. A 25 mm×175 mm strip of fabric was placed in a beaker with water, and the time it took the water to climb 2 cm vertically was measured. All fabrics were pre-conditioned at 21° C. and 65% RH (according to ASTM D 1776) for 48 hours before testing.

Results and Discussion

Growth of Clay/Polymer Assemblies.

Figure 5:
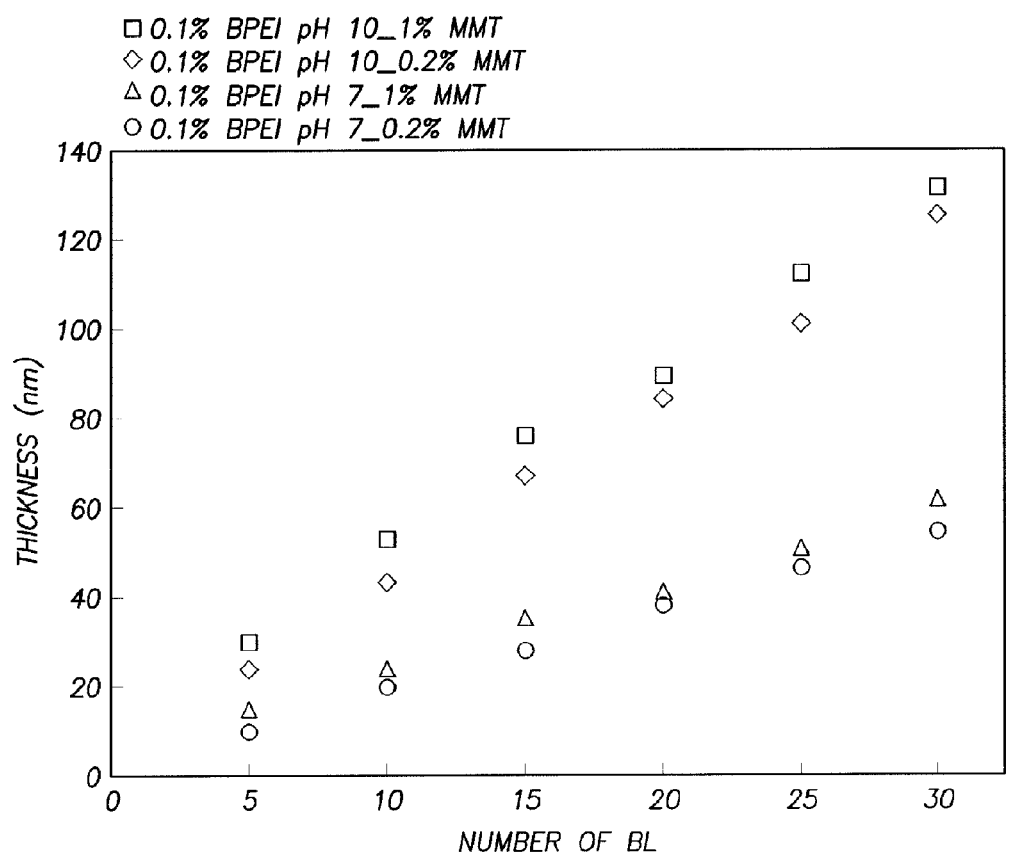
FIG. 5 illustrates film thickness as a function of the number of deposited bilayers.

The influence of pH and concentration of the deposition mixtures on the growth of the thin films was evaluated by ellipsometry. Four different thin film recipes, BPEI pH 7 and 10, with MMT at 0.2 wt. % and 1 wt. %, were used to prepare the films with the growth shown in FIG. 5. FIG. 5 shows film thickness as a function of the number of bilayers deposited, for a series of LbL assemblies made with varying pH of the BPEI solution and concentration of the MMT mixture. MMT was used at its unadjusted pH of 9.8. All four systems grew linearly as a function of BPEI-MMT bilayers deposited. The film thicknesses were very similar for films made with the same pH BPEI solution, regardless of variation in clay concentration. Differences observed between high and low pH systems were due to the different degrees of charge density of the weak polyelectrolyte BPEI. When this weak polyelectrolyte was highly charged, the polymer chains adopted a flat conformation, whereas at low charge density, the polymer had a more coiled and bulky conformation. In order to better understand the growth process, a QCM was used to measure the weight increase with the deposition of each individual layer.

Figure 6:
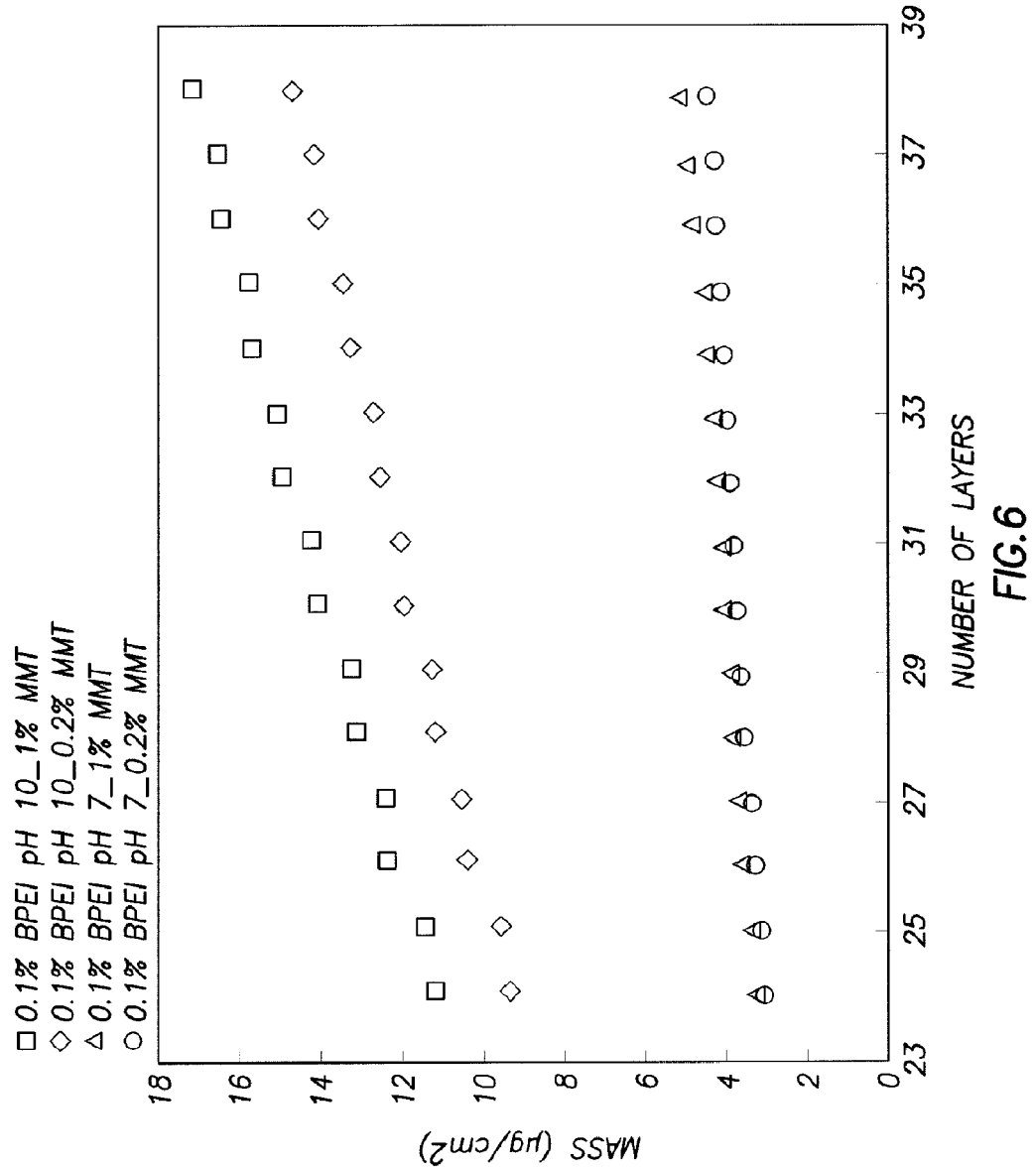
FIG. 6 illustrates film mass as a function of individually deposited clay and polymer layers.

FIG. 6 shows the QCM data for the four different recipes described above. FIG. 6 shows film mass as a function of individually deposited clay and polymer layers for four different BPEI/MMT systems. In all cases, odd layers are BPEI and even ones are MMT. There was not much difference observed in mass per layer of the films made with pH 7 BPEI and two different concentrations of MMT mixture (0.2 and 1 wt. %), but the films made with pH 10 BPEI and two concentrations of MMT showed a significant difference in unit mass. The amount of BPEI deposited for each layer was similar between the films made with the same pH, but BPEI at pH 7 deposited less in each layer than BPEI pH 10 (about one-third the amount). Table 1 summarizes the BPEI and MMT compositions that were calculated for each film. The films made with 1 wt. % MMT and BPEI at different pH values had higher MMT content than films made with 0.2 wt. % MMT. In all four film recipes, it was believed that film thickness was influenced primarily by the pH of the BPEI solution and only slightly by the concentration of clay. Film weight was quite different, with MMT concentration of the deposition mixture becoming significant at the higher pH of BPEI. This may be explained by the following models. When BPEI had a higher charge density at low pH, it lies flatter on the charged substrate due to self-repulsion, and the clay platelets may only lay parallel to the substrate, covering the topmost surface. In this case, films made with 1 wt. % MMT mixtures achieved slightly better coverage per deposition than films made with 02 wt. % MMT, resulting in similar thicknesses and weights for the two films. When BPEI had a lower charge density (at pH 10), it was more coiled and entangled, thus creating thicker films as it was deposited. This thicker layer allowed more clay platelets to deposit in the pockets between coils and tangles. In this scenario, a higher concentration of MMT (1 wt. %) may provide for more loading of the BPEI pockets during each deposition step than the more dilute mixture (0.2 wt. % MMT).

TABLE 1

Film composition of BPEI/MMT recipes.

| LbL system | BPEI wt % | MMT wt % |
|---|---|---|
| BPEI (pH 10)/0.2 wt % MMT | 22 = 6 | 78 ± 13 |
| BPEI (pH 7)/0.2 wt % MMT | 28 = 10 | 72 ± 25 |
| BPEI (pH 10)/1 wt % MMT | 17 = 6 | 83 ± 12 |
| BPEI (pH 7)/1 wt % MMT | 13 = 6 | 87 ± 18 |

Tapping mode AFM was used to characterize the surfaces of 30 BL MMT-composite films made with high and low pH of BPEI. The root-mean-square (rms) of the area roughness (using a 20 µm square area) for the BPEI pH 7/I wt. % MMT film was 38 nm, while it was 62 nm for the BPEI pH 10.1% MMT film, which suggested that the surface was covered by clay platelets with a largest dimension oriented parallel to the surface of the silicon substrate. Because of the different morphology of BPEI at high and low charge densities, the surface was rougher for films made with pH 10 BPEI. A 40 BL film was made with BPEI pH 10/0.2 wt. % MMT. The film was deposited on polystyrene substrates to facilitate sectioning. All surfaces were well covered by the deposited MMT platelets.

Flame Resistance of Fabric.

Cotton fabric was coated with 5 and 20 bilayers of BPEI/MMT, using the four different recipes described in the previous section describing thin film growth. The coating weight was determined by weighing 12 by 15 in. samples of fabric before and after coating. All samples were weighed only after oven-drying at 80° C. for 2 hours to remove moisture. Weight added to the fabric by each coating system is shown in Table 2 as a percentage of the uncoated weight. The weight gain from coating on fabric does not correlate well to the weight gain measured by QCM for the films assembled on a quartz crystal. At 5 BL, fabric coated using BPEI at pH 10 was heavier than fabric coated using pH 7 BPEI, but at 20 BL the fabric weight gain was greater with pH 7 BPEI. This may be linked to differences in adhesion and substrate geometry.

TABLE 2

Weight added by coating fabrics, and residue amounts after heat treatment.

| Sample | Add-on (%) | | 500° C. residue (%) | | 600° C. residue (%) | |
|---|---|---|---|---|---|---|
|  | 5 BL | 20 BL | 5 BL | 20 BL | 5 BL | 20 BL |
| Control |  |  | 1.77[b] |  | 0.30[b] |  |
| BPEI pH 10/0.2% MMT | 2.05 | 2.31 | 9.12 | 11.70 | 1.29 | 2.09 |
| BPEI pH 7/0.2% MMT | 0.97 | 2.89 | 7.00 | 10.39 | 1.17 | 3.28 |
| BPEI pH 10/1% MMT | 2.23 | 4.06 | 11.26 | 12.16 | 1.70 | 2.82 |
| BPEI pH 7/1% MMT | 1.82 | 4.41 | 9.33 | 13.02 | 1.47 | 4.72 | a: Residue values obtained from TGA testing under air atmosphere.
[b]The residue weight percent of uncoated fabric.

Two coatings were prepared using a 1% MMT mixture with BPEI at high and low pH. All of the individual cotton fibers were easily discerned for the 20 BL coating made with BPEI at pH 10. The same coating applied using BPEI at pH 7 appeared thicker and stickier, actually bridging multiple fibers.

Figure 7A:
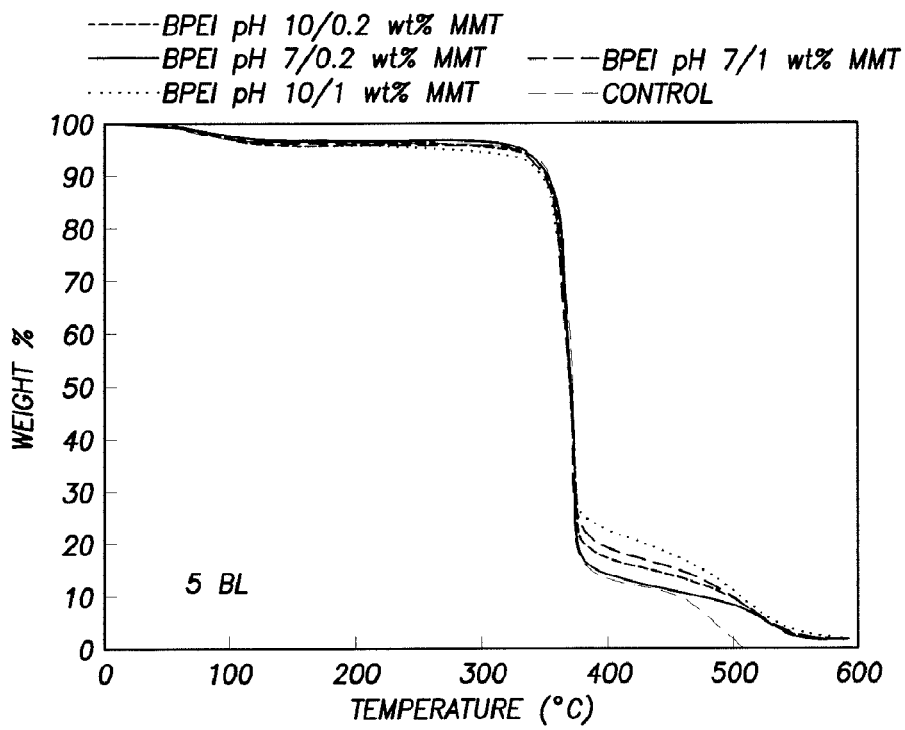
FIG. 7a) illustrates weight loss as a function of temperature.
Figure 7B:
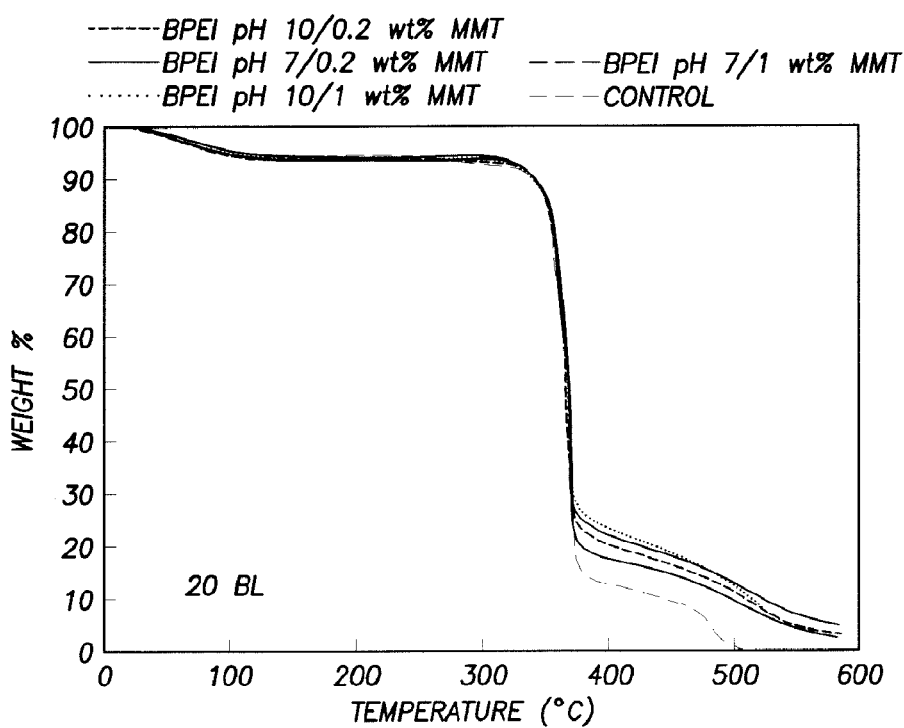
FIG. 7b) illustrates weight loss as a function of temperature.

FIGS. 7a) and 7b) show TGA results of four coating recipes at 5 (FIG. 7a)) and 20 BL (FIG. 7b)). Weight loss as a function of temperature for cotton fabrics coated with 5 bilayers is shown in FIG. 7a), and 20 bilayers is shown in FIG. 7b) with both Figures having 0.1% wt. % BPEI (pH 10 and 7) with 0.2 and 1 wt. % MMT. The results were obtained using TGA at a heating rate of 20° C./min under an air atmosphere. At 500° C. under an air atmosphere, the uncoated control fabric left less than 1.8 wt. % residue, as shown in FIGS. 7a) and 7b). With the addition of 2 wt. % for a 5 BL coating and 4 wt. % for a 20 BL coating, residue weight percentages for the coated fabrics were one order of magnitude higher than the control. The residue amounts for the control fabric and each coated fabric were summarized in Table 2. At the final stage of the testing, there was essentially no char left from the control fabric, but there was a significant amount of residue left from 20 BL-coated fabrics. The mass of the residue from a coated fabric clearly demonstrated that there was preservation of cotton during burning, because some residues were greater than the mass of the coating itself (see add-on % in Table 2). The amount of charred cotton in the residue was probably higher than the mass difference between residue and the coating by itself (in all cases), because at least a fraction of the BPEI in the coating was degraded during heating (pure BPEI completely decomposes below 650° C.). There was a direct correlation between added coating weight (Table 2) and residue generated in the TGA. Additionally, the better surface coverage by the pH 7 BPEI system at 20 BL resulted in 10% greater coating weight, but 67% greater char at 600° C.

An equivalent set of coated fabric samples was put through vertical flame testing (ASTM D6413). Time to ignition did not increase upon coating the fabric, but a brighter and more vigorous flame was observed on the control fabric compared to the coated fabrics at 5 seconds after ignition. The flame on the coated fabric was not very vigorous. Additionally, more glow was seen on the control fabric after the flame was removed. The control and eight different coated fabrics showed similar after-flame times (i.e., time that fire was observed on samples after direct flame removed), but the afterglow times for coated fabrics were 9 seconds less than for the uncoated fabric. After burning, no control fabric was left on the sample holder, but all four 20 BL-coated fabrics left significant residues. The residues from 20 BL-coated fabrics were heavier and preserved the fabric structure better than the residues from fabrics coated with only 5 BL.

All fabrics were imaged by scanning electron microscopy, before and after flame testing, to evaluate the surface morphology and fabric structure. The control fabric left only ash after flame exposure, so these ashes were for imaging, whereas coated fabric images were more representative from the center of the charred remains. The fiber surface in the control fabric appeared very clean and smooth compared to the coated fabrics. Small MMT aggregates were seen on the fibers of the coated fabrics that were likely the result of inefficient rinsing of fabric between layers. Each fiber of the fabric was at least partially, if not completely, covered by the clay coating. After flame testing, the ash from the uncoated fabric and the residue from coated fabric were imaged under the same magnification. It was viewed that the ashes of the uncoated cotton fabric no longer had the same fabric structure and shape of the original fibers. Broken pieces and holes in the fiber strands illustrated the complete destruction that occurred during burning of uncoated cotton. It was surprising that with only 5 BL, the fabric structure was maintained, and the fibers were relatively intact. It was believed that during burning at high temperature, the MMT platelets fused together to some extent, which accounted for not seeing aggregated MMT or the edges of the platelets after burning, but rather large continuous pieces of coating instead. The dimensions of the weave structure in uncoated and coated fabrics were identical, which means that the LbL coating process did not alter the fabric dimensions. After burning, ash remaining from the uncoated fabric did not show the weave structure anymore, but the residue from coated fabrics retained the weave structure, especially the 20 BL, BPEI pH 7/1 wt. % MMT-coated fabric. Even the width of individual yarns is similar to the width before burning for this sample. The 5 BL (BPEI pH 7/1 wt. % MMT)-coated fabric also retained its weave structure, although the threads shrank after flame testing, leaving gaps between the yarns. Despite using the same concentration of clay deposition mixture (I wt. % MMT), the weave structure of the residue from 20 BL-coated fabric made using pH 10 BPEI had larger gaps between yarns as compared to the fabric coated (20 BL) using BPEI pH 7. This was an expected result due to the smaller add-on percentage of the BPEI pH 10 coating, as well as to the greater surface coverage achieved by the coating when highly charged pH 7 BPEI is used.

Figure 8:
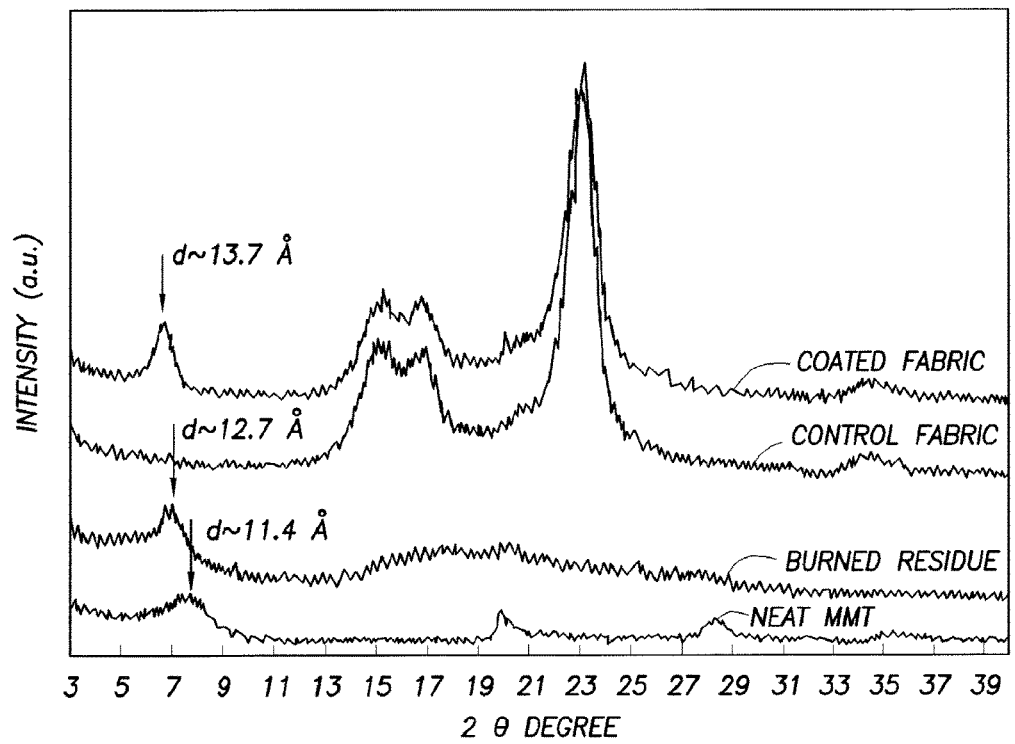
FIG. 8 illustrates X-ray diffraction patterns for fabric.

The XRD pattern in FIG. 8 provided additional evidence of the coating of the fabric. In FIG. 8, the low-angle peak at 7.8° for neat MMT clay was derived from a basal spacing of 11.4 Å, which was the periodic distance from platelet to platelet. X-ray diffraction patterns were for neat MMT, for 20 BL BPEI pH 7/1 wt. % MMT coated fabric, before and after burning, and for the control fabric. On the fabric coated with BPEI pH 7/1 wt. % MMT, the peak was shifted to 6.4°, suggesting that even on the non-flat fiber surface the clay may be deposited in an orderly orientation; the basal spacing was increased to 13.7 Å because of intercalation with BPEI. After vertical flame testing, the residue from coated fabric was also scanned by XRD, finding that the basal spacing decreased from 13.7 to 12.7 Å, which suggested that the intercalated BPEI might decompose or be ablated during the burning process, resulting in a reduction of the basal spacing of MMT. The positions of the low-angle MMT peak in scans (data not shown) of fabric coated with BPEI pH 10/1 wt. % MMT (before and after flame test) showed no significant difference between the two recipes.

Another tool for assessing the fire behavior of a small (mg) sample was the microscale combustion calorimeter (MCC). The MCC simulated the burning process by using anaerobic pyrolysis and a subsequent reaction of the volatile pyrolysis products with oxygen under high temperatures to simulate surface gasification and flaming combustion. Both heat release rate and temperature as a function of time at constant heating rate were measured during the test. Key parameters coming from the MCC test included temperature at maximum heat release rate (Tp), specific heat release rate (HRR in W/g) that was obtained by dividing the heat release rate at each point in time by the initial sample mass, and total heat release (THR in kJ/g) from combustion of the fuel gases per unit mass of initial sample (obtained by time-integration of HRR over the entire test). Residue was calculated by weighing the sample before and after the test. A derived quantity, the heat release capacity (HRC in J/g K) was obtained by dividing the maximum value of the specific heat release rate by the heating rate during the test. HRC was a molecular level flammability parameter that was a good predictor of flame resistance and fire behavior when only research quantities were available for testing. Reproducibility of the test for homogeneous samples was about ±8%.

MCC data for the coated fabric samples was summarized in Table 3. All residues from coated fabrics tested at 700° C. under nitrogen atmosphere were higher than those from uncoated fabric. The residue did not come only from the coating (see add-on wt. % in Table 2), but the fabric itself was preserved (1-5 wt. %) when coated with various recipes. These results suggested that clay surrounded each fiber and acted as a protective barrier capable of promoting char formation during the pyrolysis of the fabric. An increase in charring induced a decrease in the amount and rate of combustible volatile release, resulting in lower flammability (as evidenced by lower THR and HRC values in the MCC). The maximum reduction in THR (20%) and HRC (15%) as compared to the control was observed in the fabric coated with 5 BL of BPEI pH10/1 wt. % MMT. Increasing the number of bilayers up to 20 for the same sample did not appear to produce any significant variation in the MCC data. This suggested that a 5 BL coating may be sufficient for generating an effective fire barrier on the textile. An increase in Tp was also observed in all coated fabrics, which was likely due to the formation of a low permeability barrier that delayed the release of combustible volatiles.

different in warp direction, while in fill direction there was less than a 5% difference. Therefore, the coating of polymer and clay layers on the fabric did not significantly alter the fabric's physical structure. Wet processing of cotton fabrics with traditional textile finishes often causes shrinkage and compaction in the yarns, resulting in more yarns per inch and affecting the comparison of physical properties of the treated fabrics to control materials.

TABLE 4

Fabric counts of uncoated and coated fabrics.

| Sample | BL number | Warp | Fill |
|---|---|---|---|
| Control | | 79 | 78 |
| BPEI pH 10/0.2% MMT | 5 | 78 | 79 |
| | 20 | 81 | 81 |
| BPEI pH 7/0.2% MMT | 5 | 78 | 78 |
| | 20 | 80 | 82 |
| BPEI pH 10/1% MMT | 5 | 80 | 78 |
| | 20 | 78 | 79 |
| BPEI pH 7/1% MMT | 5 | 79 | 79 |
| | 20 | 77 | 79 |

The Elmendorf tearing test, which used a falling pendulum to determine the amount of force required to tear the fabric (ASTM D 1424), was used to evaluate tear strength. A strip tensile strength test was used to determine the maximum force that can be applied to a material (sampled

TABLE 3

Microscale combustion calorimeter results for various coated fabrics.

| | Residue (%) | | HRC (J/g K) | | THR (kJ/g) | | Tp (° C.) | |
|---|---|---|---|---|---|---|---|---|
| Sample | 5 BL | 20 BL | 5 BL | 20 BL | 5 BL | 20 BL | 5 BL | 20 BL |
| Control | 2.88 ± 0.40 | | 273.67 ± 25.38 | | 11.63 ± 0.21 | | 369 ± 0.58 | |
| BPEI pH 10/0.2% MMT | 6.38 ± 1.50 | 7.48 ± 0.50 | 254.33 ± 25.01 | 250.33 ± 14.50 | 11.23 ± 0.25 | 11.10 ± 0.36 | 374 ± 0.58 | 376 ± 7.65 |
| BPEI pH 7/0.2% MMT | 6.75 ± 0.60 | 6.74 ± 0.20 | 260.33 ± 4.04 | 286.33 ± 8.51 | 11.17 ± 0.40 | 11.90 ± 0.36 | 376 ± 2.00 | 369 ± 0.58 |
| BPEI pH 10/1% MMT | 10.52 ± 0.30 | 10.49 ± 0.50 | 220.00 ± 6.08 | 221.30 ± 7.57 | 9.87 ± 0.31 | 10.23 ± 0.06 | 382 ± 0.58 | 380 ± 0.58 |
| BPEI pH 7/1% MMT | 8.37 ± 0.50 | 10.54 ± 0.30 | 251.30 ± 10.02 | 240.30 ± 11.37 | 10.73 ± 0.25 | 10.70 ± 0.50 | 379 ± 1.00 | 377 ± 2.65 |

Physical Properties of Fabric.

There was no difference in appearance between coated and uncoated fabric. Even tactile assessment of the fabric by touch of hand, was the same for all coated and uncoated samples tested. As a result of this similarity, some measurements were needed to distinguish between the coated and uncoated fabric. In many cases, the addition of a flame retardant resulted in loss of strength or the degradation of other fabric properties (e.g., moisture wicking), so it was important to know if this coating technology changed the properties of the fabric. Fabric count, tear and tensile strength, and wicking behavior of coated fabrics were evaluated in comparison with control fabric.

Fabric count was determined by following the ASTM D 3775 standard method. Yarn number in the warp and fill directions of fabric was counted on a 25×25 mm area of the fabric. Five randomly selected areas from each coated fabric were used to determine the average fabric count. These counts are summarized in Table 4 where the yarn numbers of 5 BL-coated fabrics in both directions are shown to be only 1.2% different from the control fabric. For the 20 BL-coated fabrics, the yarn number was less than 2.5% as a strip) until it fractured (ASTM D 5035). Additionally, the strip test measured the apparent elongation of the fabric. The Elmendorf and tensile tests showed similar results, which were summarized in Table 5. The warp direction for the coated fabrics exhibited improvement in both tearing and breaking strength when compared to the control fabric, while the fill direction showed a general decrease in strength. The elongation results had slight directionality as well. The warp direction showed a decrease in elongation, while the fill direction showed an increase. All of these properties were within 10% of the uncoated fabric, so the data did not reveal a clear connection between coating and strength properties. The sporadic nature of the results as well as the incoherent pattern suggested that the results were not based on a change in fiber structure due to the coating but rather were within the range of strength and elongation for the uncoated fabrics. In other words, the coating neither greatly improved nor harmed the fabric's mechanical strength. It was therefore assumed that there was not a significant change to the structure of the fibers during the coating process, which was an improvement relative to traditional textile finishing.

TABLE 5

Tearing force and tensile breaking force of uncoated and coated fabrics.

| Sample | BL number | Tearing Force (lbs) Warp | Fill | Breaking Force (lbs) Warp | Fill | Elongation (%) Warp | Fill |
|---|---|---|---|---|---|---|---|
| Control | | 2.11 | 2.02 | 66.30 | 69.34 | 19.5 | 30.7 |
| BPEI pH 10/0.2% MMT | 5 | 2.26 | 1.99 | 77.92 | 68.09 | 15.7 | 38.5 |
| | 20 | 2.25 | 2.02 | 67.23 | 63.66 | 16.9 | 36.4 |
| BPEI pH 7/0.2% MMT | 5 | 2.24 | 2.12 | 80.33 | 65.88 | 14.7 | 36.8 |
| | 20 | 2.22 | 2.05 | 75.29 | 66.13 | 14.7 | 36.3 |
| BPEI pH 10/1% MMT | 5 | 2.21 | 1.86 | 80.11 | 61.54 | 12.1 | 30.1 |
| | 20 | 2.25 | 1.80 | 78.58 | 73.50 | 13.5 | 31.2 |
| BPEI pH 7/1% MMT | 5 | 2.29 | 2.01 | 71.35 | 66.43 | 12.8 | 31.1 |
| | 20 | 2.04 | 1.87 | 68.76 | 63.23 | 14.5 | 30.8 |

The AATCC Committee RA63 proposed test method for wicking was used to test the transfer of water through the various fabric samples. Most standard fabrics absorb water through capillary action, using the gaps between warp and fill yarns as small capillaries, causing them to absorb a comparatively large amount of water. The wicking test measured the time it takes water to travel up a piece of fabric in an Erlenmeyer flask or beaker. Shorter wicking times (i.e., faster movement of water up the test strip) indicated better wicking ability. The wicking distance was 20 mm, and wicking rates were calculated by dividing the wicking distances by the average wicking times. Wicking rates in the warp and fill directions of each fabric were summarized in Table 6. For all the coated fabrics, both warp and fill wicking rates were much slower (by a factor of 2-3) than the control fabric, indicating that their ability to absorb and transport water was not as great as the control. This was not surprising, considering the outermost clay layer had been analyzed using ab initio molecular dynamics where it was concluded that its tetrahedral surface (i.e., the oxygen plane, which was the widest dimension in MMT surface) may be considered hydrophobic. In addition, contact angle results were 72° for a coating of BPEI pH 7/1 wt. % MMT on a Si wafer, and 74° for BPEI pH 10/1 wt. % MMT, suggesting that the MMT-covered surface was more hydrophobic since both contact angles were larger than the 38° measured for a bare Si wafer. Among the four different systems of fabric coatings, the ones involving BPEI pH 7 had slower wicking rates than those made using BPEI pH 10, which suggested that it was harder for water to be transported through pH 7 BPEI coated fabrics. This behavior may be explained as caused by the MMT platelets lying parallel to the fiber surface during deposition, with highly charged BPEI at pH 7 packing the platelets especially tightly. Such an arrangement of clay platelets, which were slightly hydrophobic, provide excellent coverage and sealing of fiber surfaces, thus interfering with the moisture transport both along and through the fiber.

TABLE 6

Vertical wicking rate of fabrics.

| Sample | BL number | Wicking Rate (mm/s) Warp | Fill |
|---|---|---|---|
| Control | | 2.50 | 2.61 |
| BPEI pH 10/0.2% MMT | 5 | 1.25 | 0.91 |
| | 20 | 1.22 | 1.00 |
| BPEI pH 7/0.2% MMT | 5 | 0.72 | 0.48 |
| | 20 | 0.82 | 0.67 |
| BPEI pH 10/1% MMT | 5 | 2.00 | 0.79 |
| | 20 | 1.22 | 0.97 |
| BPEI pH 7/1% MMT | 5 | 0.81 | 0.44 |
| | 20 | 0.86 | 0.61 |

CONCLUSIONS

This study focused on various BPEI/MMT thin film assemblies, with the goal of developing a flame-retardant coating system for cotton fabrics. Films assembled with high and low pH polyethylenimine and 1 and 0.2 wt. % clay suspensions all showed linear growth as a function of the number of bilayers deposited. Higher BPEI pH resulted in much thicker assemblies due to lower charge density. With respect to clay, using a higher concentration resulted in slightly thicker films. These layer-by-layer assembled coatings were applied to cotton fabric to evaluate flammability. Flame-retardant properties of 5 and 20 BL coatings on fabric were tested with TGA, vertical flame testing, and micro-combustion calorimetry. A 6 to 11% residue was left over from coated fabric after heat treatment at 500° C. under air atmosphere, whereas the control fabric completely combusted. This level of charring is significant, because the coating contributed only 1 to 4 wt. % to the fabric (depending on recipe and number of layers) prior to burning. During actual burning in the vertical flame test, afterglow time was significantly reduced for the coated fabrics. The weave structure of the fabric, as observed in SEM images, was well preserved relatively in the chars from coated fabrics, whereas the scant ashes from the control fabric showed little structure. SEM also revealed that each individual yarn was protected by the sheath-like coating. Additionally, micro-calorimeter testing revealed lower heat release for coated fabrics, suggesting that fewer combustible volatiles were generated. The physical properties of the fabrics did not show great differences between control and coated, suggesting that the coating did not adversely affect the desirable properties of the fabric itself. The relative simplicity of the layer-by-layer process provides a convenient method for imparting flame resistance to fabric using relatively benign ingredients. In addition to clays, other types of flame-retardant particles and polymers may be considered for use in these types of coatings.

Example 2

Southern Clay Products. Inc. (Gonzales, Tex.) supplied the natural sodium montmorillonite (MMT) (Cloisite® Na+ a trademark of Southern Clay Products, Inc.) used in this study. MMT had a cationic exchange capacity of 0.926 meq/g and a negative surface charge in deionized water. Individual platelets had a density of 2.86 g/cm$^3$, diameter of 10-1000 nm (most have d>200 nm) and a thickness of 1 nm. Cationic polyacrylamide (Superfloc® C-491, a trademark of American Cyanamid Company) was provided by CYTEC (West Paterson, N.J.). This was a copolymer containing 5 mol % of positively-charged repeat units. Cationic poly (diallyldimethylammonium chloride) (PDDA) and branched polyethylenimine (BPEI) (Mw=25,000 g/mol and Mn=10,000 g/mol) were purchased from Aldrich (St. Louis, Mo.). Polystyrene (PS) film, with a thickness of 250 μm, was purchased from Goodfellow (UK) and used as the substrate for transmission electron microscopy. Single side polished (100), 500 μm thick silicon wafers (University Wafer, South Boston, Mass.) and fused quartz glass slides (Structure Probe Inc., West Chester, Pa.) were used as substrates for film growth characterized by ellipsometry and UV-Vis, respectively. Polished Ti/Au crystals with a resonance frequency of 5 MHz were purchased from Maxtek, Inc (Cypress, Calif.) and used as the deposition substrates for quartz crystal microbalance characterization. Open-cell Polyurethane (PU) foam was provided by the NIST (Gaithersburg, Md.) and virgin cotton fabrics were supplied by the USDA Southern Regional Research Center (New Orleans, La.).

Film Preparation

Aqueous solutions of branched polyethylenimine (0.1 wt. % in deionized water) were prepared by rolling for 24 hours. Prior to deposition, each BPEI solution's pH was altered using IM HCl. Anionic suspensions of MMT (0.2 wt. % in deionized water) were prepared by rolling for 24 h. For deposition PS, substrates were rinsed with deionized water, methanol, and again with water before finally being dried with filtered air. These substrates were then corona treated using a BD-20C Corona Treater (Electro-Technic Products, Inc., Chicago, Ill.), creating a negative surface charge. For deposition onto silicon wafers, the substrates were sonicated for 30 minutes, and a piranha treatment was performed. These substrates were then rinsed with deionized water, acetone, and again with water before finally being dried with filtered air. For polyurethane foams and cotton fabrics, the substrates were just rinsed and cleaned with deionized water. Each substrate was then dipped in the PEI solution for 5 min., rinsed with deionized water, and dried. This procedure was followed by an identical dipping, rinsing and drying procedure in the clay suspension. After this initial bilayer (BL) was deposited, the same procedure was followed with only one-minute dip times for subsequent layers. This procedure was repeated until the desired number of bilayers (BL number) was achieved. For the foams and fabrics, the drying step involved wringing the water out prior to air-drying. Films with other polymers were made using the same procedure.

Film, Foam and Fabric Characterization

Film thickness was measured using a PHE-101 Discrete Wavelength Ellipsometer (Microphotonics, Allentown, Pa.) at a wavelength of 632.8 nm and a 65° incidence angle. Mass increase as a function of individual layers deposited was measured using a Research Quartz Crystal Microbalance (RQCM) (Maxtek Inc., Cypress, Calif.). Film absorbance was monitored at wavelengths between 190 and 900 nm using a USB2000-UV-VIS Spectrometer (Ocean Optics, Dunedin, Fla.). Thin film cross-sections were imaged using a JEOL 1200EX TEM (Parbody, Mass.). Surface images of coated foams and fabrics, as well as of the chars from foams and fabrics (after heat-treatment or direct exposure to flame), were acquired with a Quanta 600 FE-SEM (FEI Company, Hillsboro, Oreg.).

Thermal Analysis and Vertical Flame Test

The thermal stability of uncoated and coated foams and fabrics was measured in a Q50 Thermogravimetric Analyzer (TA Instruments, New Castle, Del.). Each sample was run under air from room temperature to 500° C., at a heating rate of 10° C. per minute. Vertical flame tests were conducted on untreated and treated fabrics according to ASTM D6413-08. An Automatic Vertical Flammability Cabinet model VC-2 was purchased from Govmark (Farmingdale, N.Y.).

Results and Discussion

Influence pH on BPEI-MMT

Figure 9A:
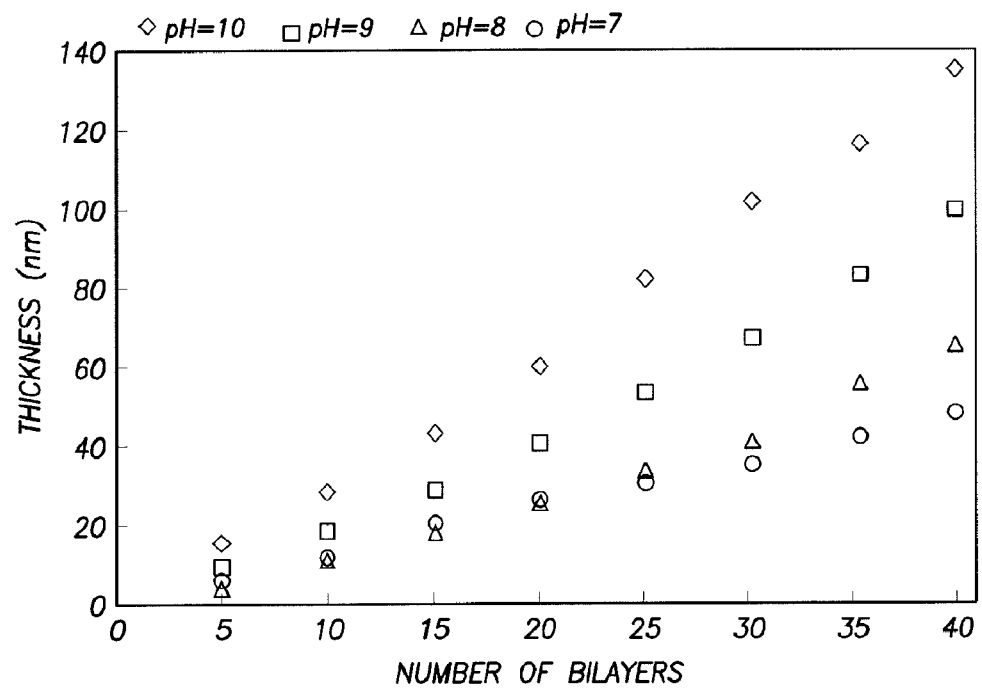
FIG. 9a) illustrates thickness as a function of bilayers.
Figure 9B:
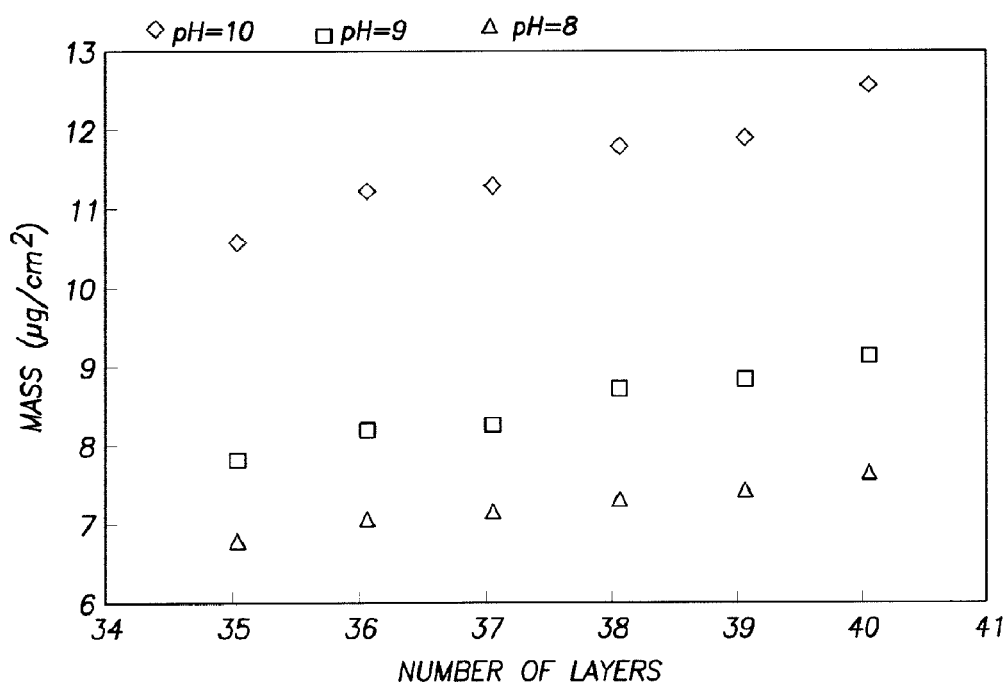
FIG. 9b) illustrates mass as a function of layers.

The pH of an aqueous solution containing 0.1 wt. % BPEI was altered from its natural value of approximately 10.4 using IM HCl to pH 7, 8, 9 and 10. Films were deposited by alternately exposing a substrate to the BPEI solutions and an aqueous suspension containing 0.2 wt. % MMT, which was not altered from its natural pH of approximately 10. FIGS. 9a), b) showed the linear growth exhibited by the combination of MMT clay with BPEI and the influence of BPEI pH on thickness. For films made with clay and polyethylenimine, thickness as a function of bilayers deposited was shown in FIG. 9a), and mass as function of individual layers deposited was shown in FIG. 9b). Thickness measurements were made with an ellipsometer suing Si wafer substrates. Mass measurements were obtained with a quartz crystal microbalance. Filled data points in FIG. 9b) denoted polymer layers, and unfilled data points denoted clay layers. Such data show that the film growth was reduced by decreasing the pH of the BPEI solution. This was due to the high charge density BPEI has at lowered pH values, which caused the polymer backbone to repel itself into a flattened state. The opposite was true at high pH, where a lower charge density and more coiled polymer resulted in thicker deposition. A deposited mass per layer was measured with a quartz crystal microbalance, as shown in FIG. 9b). While the QCM data confirm the linear growth observed with the ellipsometer, it additionally revealed the weight fraction of clay and density of each nanocomposite thin film. As expected, the thinner pH 8 film had greater clay concentration (81.6 wt. %) and density (2.63 g/cm3) than its thicker pH 10 counterpart (79.2 wt. % clay and ρ=2.1 g/cm3). This level of clay in a polymer composite was unprecedented, especially in light of the fact that these films were completely transparent (i.e., the clay was completely oriented and exfoliated).

Figure 10A:
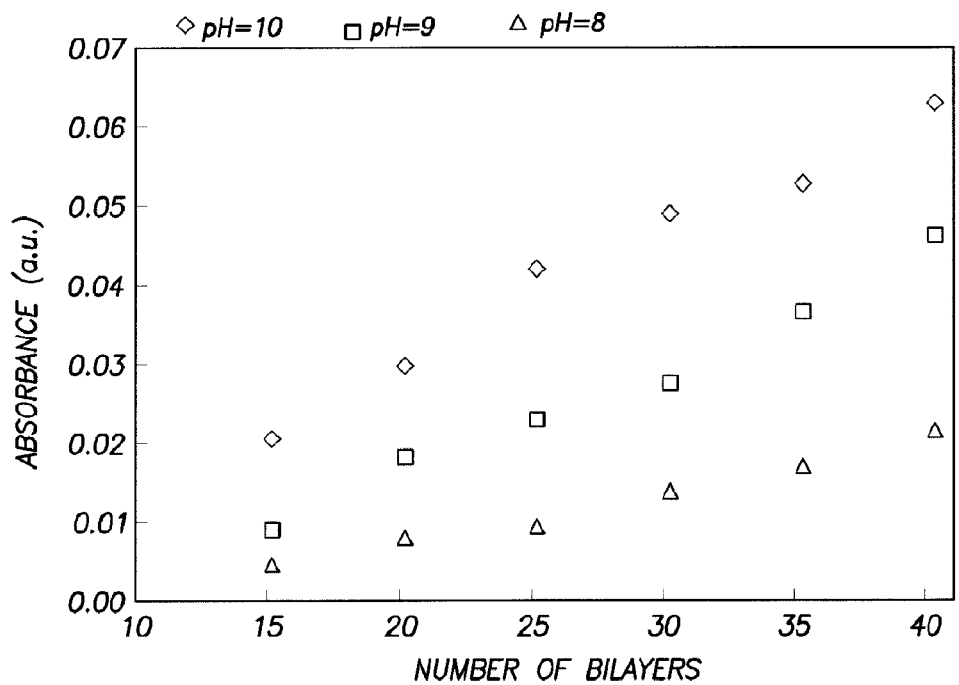
FIG. 10a) illustrates absorbance as a function of deposited bilayers.
Figure 10B:
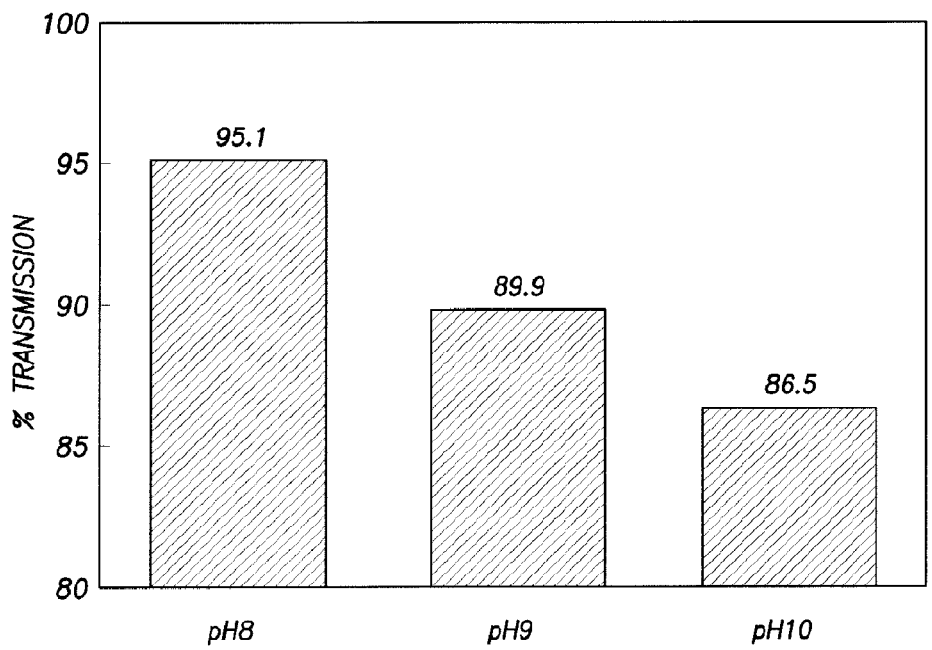
FIG. 10b) illustrates transmission as a function of pH.

Visible light absorbance as a function of bilayers deposited (FIG. 10a)) also revealed linear growth, but it also demonstrated the optical clarity of these films. Percent transmission as a function of BPEI pH in 40-bilayer films (FIG. 10b)) revealed the optical clarity control BPEI pH has on these films. In conventional clay-filled polymer composites, clay concentrations of 20 wt. % yield transmission levels of 79% at best, but with LbL assembly 95% transmission was achievable with 81.6 wt. % clay. For 40-bilayer films made with clay and PEI, absorbance at 565 nm as a function of bilayers deposited was shown in FIG. 10a), and percent transmission as a function of polyethylenimine pH was shown in FIG. 10b). Data was obtained using a UV_Vis spectrometer.

TEM images of two 40-bilayer film cross-sections were taken. Individual clay platelets were seen as dark lines in the pH 10 film, which revealed a nano brick wall structure shown schematically. The images emphasized the high level of clay exfoliation and orientation, with all platelets lying parallel to the polystyrene substrate. Furthermore, these images verified the thickness measurements shown in FIG. 9a) as the pH 8 film was approximately one half the thickness of the pH 10 film. Thicknesses of these films seemed greater than the ellipsometric measurements (FIG. 9a)), because these cross-sections were often cut at an angle rather than perpendicularly through the films surface. The waviness of these films was likely an artifact of the TEM sample preparation, which facilitated some stress relief in the films.

Example 3

Figure 11A:
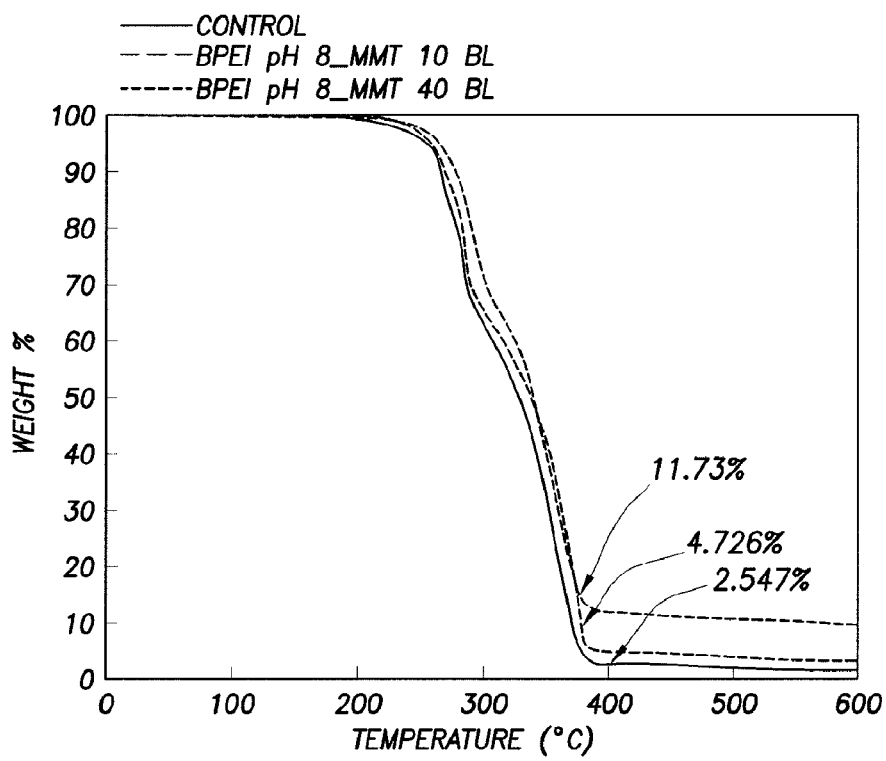
FIG. 11a) illustrates weight loss as a function of temperature.
Figure 11B:
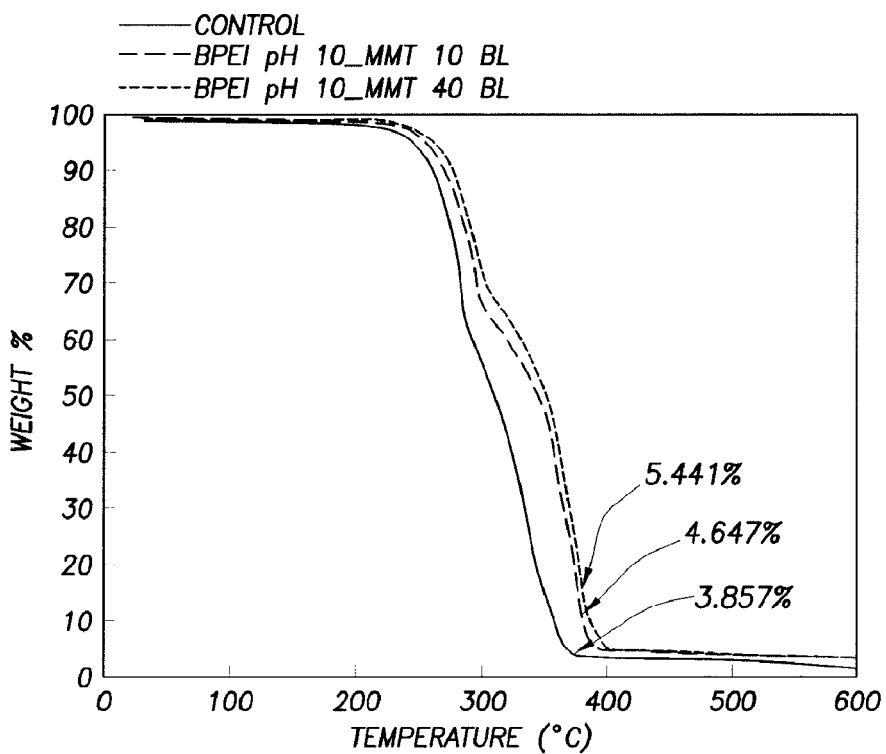
FIG. 11b) illustrates weight loss as a function of temperature.

Open-cell PU foams from NIST were coated with 10 and 40 bilayers of BPEI (at pH 8 and 10) and MMT. The onset of degradation and percent char at 500° C. determined by TGA for different foam coatings, was shown in FIGS. 11a), b). At 400° C. the highest char percentage was achieved with the pH 8 BPEI coating (11.73 wt. % char from foam coated with 40 bilayers). The coating made with BPEI pH 8 had higher clay concentration and was more dense, which may protect the foam from further degradation. Based on the success of the TGA measurements (FIGS. 11a), b)), larger foam pieces with different coatings, as well as a bare one, were placed in an oven and heated up from room temperature to 400° C. and then held for 30 minutes to observe the degradation of foams. The uncoated foam melted and stuck to the ceramic crucible and could not be detached with tweezers. The char from the foams coated with BPEI (pH 8 or pH 10), and MMT was easily removed from the crucibles. Foam coated with pH 8 BPEI left a thicker residue, which retained the open-cell structure of the foam. Compared to the foam coated with pH 8 BPEI, foam coated with pH 10 BPEI left a very thin, macroseopically porous layer.

Images of Foam Before and after Treatment

Figure 12:
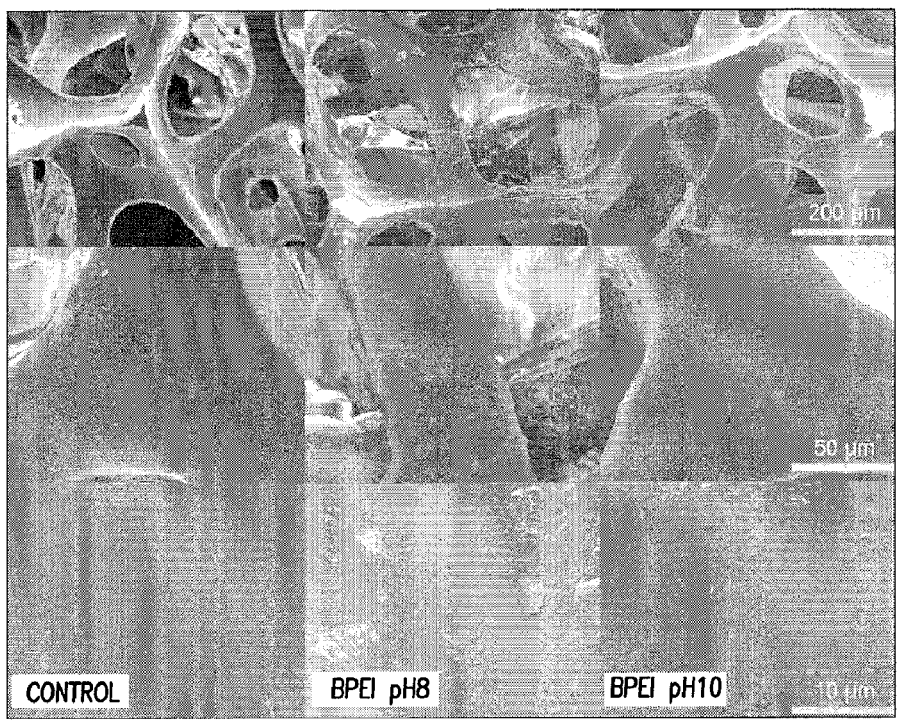
FIG. 12 illustrates SEM images of bare and coated foams.

In order to get more information about the coating on the foams, SEM was used to image the microstructure of the uncoated and coated foams. Three different foams-uncoated, coated with BPEI (pH 8)/MMT, and coated with BPEI (pH 10)/MMT were imaged (FIG. 12). FIG. 12 showed SEM images of bare and coated PU foams at different magnifications. The left column was a control foam. The center column was a foam coated with BPEI (pH 8)/MMT. The right column was a foam coated with BPEI (pH 10)/MMT. The open cell structure for the three foam samples was seen very clearly; however, in the coated foams some particles were also seen. Under greater magnification, the surface of the control foam was very smooth, unlike the coated foams, whose surfaces were covered by MMT, either aggregated or exfoliated into platelets. As expected, more MMT was observed on the foams coated with lower pH of the BPEI cationic dipping solutions.

Figure 13:
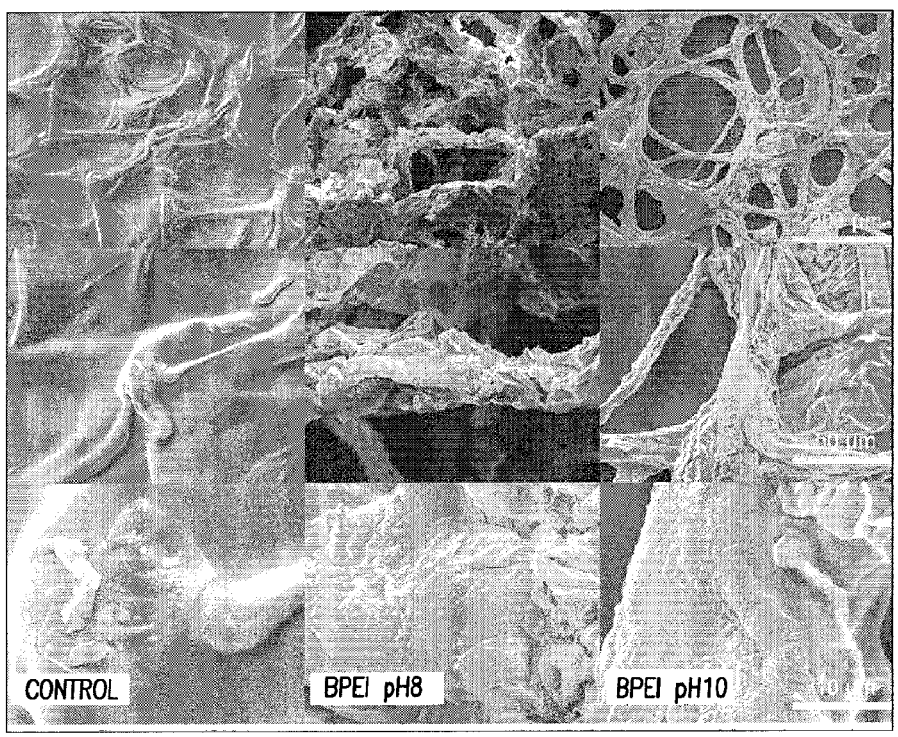
FIG. 13 illustrates SEM images of foams after heat treatment.

FIG. 13 showed SEM images of the PU foams after being heated in the oven at 400° C. Control foams were shown in the left column. Foam coated with BPEI (pH 8)/MMT was shown in the center column. Foam coated with BPEI (pH 10)/MMT was shown in the right column. The control foam, with no protective coating, melted during heating, causing the cellular structure to disappear. In the case of the foam coated with BPEI (pH 8)/MMT, it kept the open-cell foam structure. This foam allowed deeper structure (below the surface) to be observed, which meant that the degraded foam retained its volume and thickness. This was not so with the foam coated with BPEI (pH 10)/MMT, which after degradation flattened out and became a very thin layer, although it still held the open cell structure. Under greater magnification, the roughness of the surfaces of coated foams was evident, which was attributed to the clay structures leftover after the heat treatment.

Thermal Stability of Cotton Fabric

Thermogravimetric Analysis and Vertical Flame Test

Figure 14:
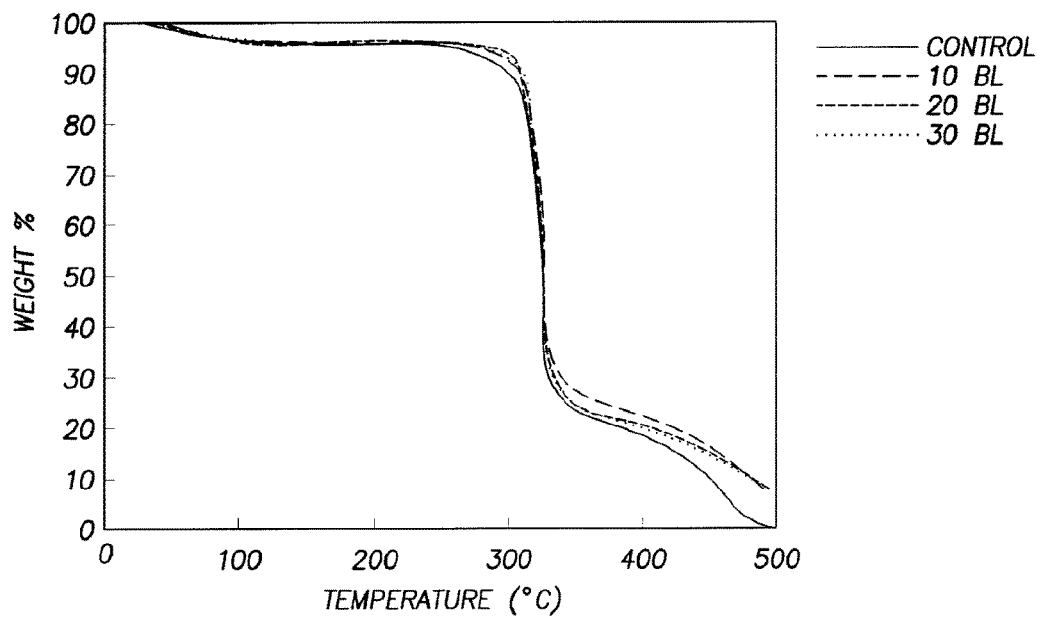
FIG. 14 illustrates weight loss as a function of temperature.

Since the foam coated with BPEI (pH 8)/MMT showed the best stability and heat resistance, the same coating formulation was used for cotton fabrics. Fabrics were coated with 10, 20, and 30 bilayers of BPEI (pH 8) MMT and analyzed with TGA. At 500° C., under an air atmosphere, the uncoated fabric left less than 0.4 wt. %. The char weight percentages for the coated fabrics were much higher, and very close to each other (around 7 to 7.3 wt. %) for the three different numbers of bilayers (FIG. 14).

An equivalent set of coated fabrics was prepared for the vertical flame test (ASTM D6413). Still shots from video-recorded flame tests at eight seconds were taken after ignition. A more vigorous flame was observed on the control fabric compared to the coated fabrics. Additionally, the flame on the control fabric grew faster. After burning, no control fabric was left on the sample holder, but the three coated fabrics left char to different degrees.

SEM images showed the microstructures of the uncoated and coated fabrics. The fiber surface in the control fabric appeared very clean and smooth compared to the coated fabrics. Increased amounts of aggregated MMT particles were seen on the fibers as the BL number of the coating increased. Each fiber of the fabric was at least partially, if not completely, covered by the clay coating.

After the vertical flame tests, the chars were also imaged by SEM. Because the control fabric was burned completely, its ashes were taken from the edge of the sample holder for imaging. Holes in the thread strands of the control fabric, caused by burning, were seen very clearly in the SEM images, as well as some fibrous residues that are no longer the fabric fibers. In the case of the char from the coated fabrics, the weave structure was still maintained at the macro scale. At greater magnification, a solid shield layer on the fibers was seen clearly in the image of the 10 BL coating. It was possible that after burning at high temperature, the MMT clay platelets sintered together after cooling down, which accounted for not seeing aggregated MMT or the edges of the platelets, but large continuous pieces of coating instead.

CONCLUSIONS

Layer-by-layer self-assembled films were successfully deposited on PU foams and cotton fabrics. As shown by the TGA data and vertical flame test results, the coated foams and fabrics generated significant char. The stability of two LbL-coated substrates were clearly seen from the SEM images, before and after heat treatment.

Example 4

Chemicals and Substrates:

PAAm (molecular weight, Mw=15,000.15 wt. % in water; Polysciences, Inc., Warrington, Pa.), PSP (crystalline, +80 mesh, 96%, Aldrich, Milwaukee, Wis.), BPEI (Mw=25,000, Aldrich), and sodium montmorillonite clay (MMT) (cloisite Na+, Southern Clay, Gonzales, Tex.) were used as received. 1 M HCl and 1 M NaOH (Aldrich) were used for adjusting the pH of the deposition solutions. Silicon wafers (University Wafer, South Boston, Mass.) and polished Ti/Au crystals with a resonance frequency of 5 MHz (Maxtek, Inc., Cypress, Calif.) were used for film characterization. Desized, scoured, and bleached plain woven cotton fabric (with a weight of 119 g m$^{-2}$) was supplied by the United States Department of Agriculture (USDA) Southern Regional Research Center (SRRC, New Orleans, La.).

LbL Deposition and Film Growth Characterization:

Separate 2 wt. % PSP at pH 7 and 1 wt. % PAAm at pH 7 were prepared with deionized water (18.2 Ml) as separate deposition solutions. 1 wt. % BPEI solution (at pH 10) was used to deposit a primer layer in the assembly, to create positive surface charge, and to improve adhesion to the substrates (silicon wafer and quartz crystal). All films were assembled on a given substrate, which was dipped into the ionic deposition solutions, alternating between the anionic PSP and cationic PAAm, with each cycle corresponding to one bilayer. The first dip into each mixture was for 5 min, beginning with the anionic solution. Subsequent dips were for 1 min each. Every dip was followed by rinsing with deionized water and drying with a stream of filtered air for 30 seconds each. For the fabric coating, in order to get higher positive surface charge, the fabric was soaked in pH 2 deionized water for 5 min before deposition. Drying of fabric involved wringing the water out instead of air drying. After achieving the desired number of bilayers, the coated wafers were dried with filtered air, whereas the fabrics were dried in an 80° C. oven for 1 h. Film thickness was measured on silicon wafers using an alpha-SE Ellipsometer (J. A. Woollam Co., Inc., Lincoln, Nebr.). A Maxtek Research Quartz Crystal Microbalance (QCM) from Infinicon (East Syracuse, N.Y.), with a frequency range of 3.8-6 MHz, was used to measure the weight per deposited layer. Surface images of coated fabrics, as well as of the chars from fabrics (after direct exposure to flame), were acquired with a Quanta 600 FE-SEM (FEI Company. Hillsboro, Oreg.).

Thermal Stability, Flammability, and Combustibility of Fabric:

All tests were conducted in triplicate to obtain the reported averages. The thermal stability of uncoated and coated fabrics was measured with a Q50 Thermogravimetric Analyzer (TA Instruments. New Castle, Del.). Each sample was approximately 10 mg and was tested in an air atmosphere, from room temperature to 600° C., with a heating rate of 20° C. min$^{-1}$. Vertical and horizontal flame testing was performed on 3 (and 4) in.×12 in. sections of uncoated and coated fabrics according to ASTM D6413 and D5132, respectively. Automatic vertical and horizontal flammability cabinets (VC-2 and HC-2) (Govmark, Farmingdale, N.Y.) were used to conduct these tests. Microscale combustibility experiments were conducted with a Govmark MCC-1 Microscale Combustion Calorimeter, according to ASTM D7309 method A. The sample size was 15 mg and samples were tested with a 1° C. s$^{-1}$ heating rate under nitrogen, from 200 to 600° C. Cone calorimeter experiments were conducted on a FTT Dual Cone Calorimeter at a 35 kW m$^{-2}$ heat flux, with an exhaust flow of 24 L s$^{-1}$, using the standardized cone calorimeter procedure (ASTM E1354). All samples were mounted horizontally as per a modified cone calorimeter standard (ASTM E1740), and the sample size was 4 in.×4 in. Specifically, samples were laid onto a foil wrapped ceramic (4 in.) square brick and then held down with a metal frame according to ASTM E 740.

Figure 15:
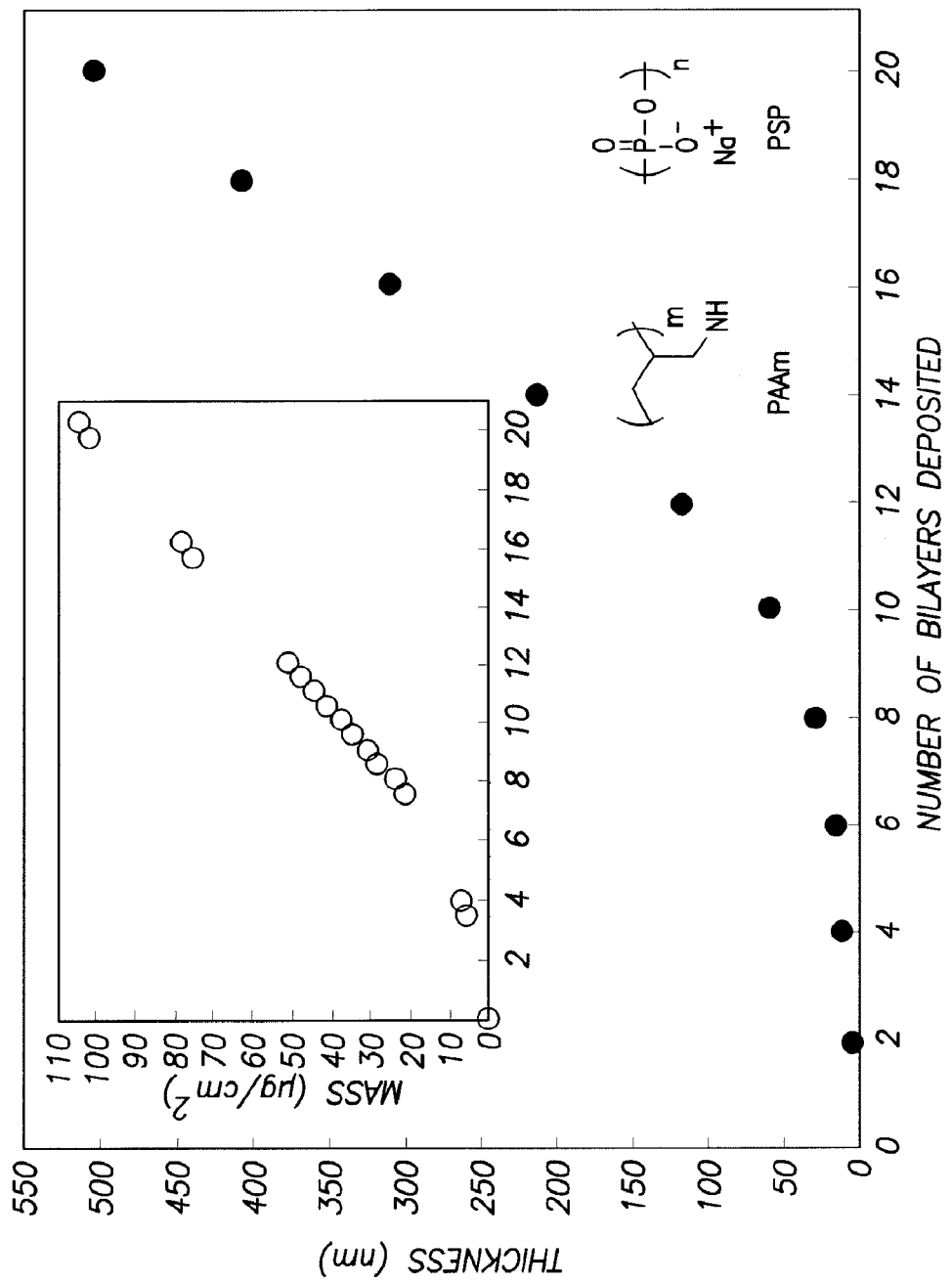
FIG. 15 illustrates thickness versus number of bilayers deposited.

FIG. 15 illustrates film thickness as a function of the number of bilayers deposited. The first bilayer was BPEI, followed by alternating layers of PSP and PAAm, i.e., PSP/PAAm bilayers deposited. The inset shows accumulated film mass as a function of deposited layers. Half bilayers represent PAAm deposition. Table 7 show a microscale combustion calorimetry measurements of PSP/PAAm-coated fabric.

TABLE 7

| Sample | Char % (Yield) | HRR Peak(s) (W g$^{-1}$) | HRR Peak Temp (° C.) | THR (kj g$^{-1}$) |
|---|---|---|---|---|
| Control | 9.59 ± 0.61 | 252.94 ± 8.18 | 399.68 ± 1.25 | 11.77 ± 0.23 |
| 5 BL | 23.83 ± 1.96 | 145.67 ± 14.47 | 306 ± 2.65 | 5.77 ± 0.4 |
| 10 BL | 31.43 ± 0.06 | 97.33 ± 7.09 | 302.67 ± 4.73 | 2.87 ± 0.12 |
| 20 BL | 31.07 ± 0.38 | 92.33 ± 16.2, 16.67 ± 2.08 | 306.67 ± 4.73, 414.67 ± 1.15 | 3.8 ± 0.17 |

In conclusion. LbL assemblies of PSP and PAAm were successfully deposited on various substrates, including cotton fabric. By applying these thin coatings on fabric, afterglow was eliminated, and after-flame time was reduced in VFT. Flame was completely extinguished on fabric coated with 20 BL of PSP PAAm. Post-burn chars were imaged with SEM and the weave structure, and fiber shape and structure, was shown to be well preserved. Especially on the 20 BL char, bubbles were formed on the fiber surfaces during burning, which was believed due to an intumescent effect. From microscale calorimetry data, the peak heat release rate and total heat release of fabric showed a 43% and 51% reduction compared to the control fabric, with only 1.7 wt. % coating added. This work demonstrated the first ever intumescent nanocoating prepared using LbL assembly. These all-polymer coatings provide an environmentally friendly alternative for protecting fabrics (chemical treatments may not be needed) such as cotton and lay the groundwork for rendering many other complex substrates (e.g., foam) flame-retardant without altering their processing and desirable mechanical behavior. The opportunity for further improvements is tremendous through the use of alternate polymers, nanoparticles, and/or smaller molecules that may enhance these effects.

Example 5

Materials. Cationic deposition solutions were prepared by adjusting the pH of deionized water (18.2 MΩ, pH ~5.5) to 2 with hydrochloric acid (HCl) and then adding 0.1 wt. % chitosan (MW 50-190 kDa, 75%-85% deacetylated) purchased from Aldrich (Milwaukee, Wis.). This aqueous solution was magnetically stirred for 24 h until the chitosan was completely dissolved. The solution pH was adjusted to 3 or 6 with 1 M NaOH just prior to deposition. Anionic solutions were prepared by adding 1.0 wt. % of sodium montmorillonite (trade name: Cloisite Na+), provided by Southern Clay Products, Inc. (Gonzales, Tex.), to deionized water and rolling the material for 24 h. This MMT had a cationic exchange capacity of 0.926 mequiv/g and a negative surface charge in deionized water. Individual platelets had a density of 2.86 g/cm$^3$, with a planar dimension of 10-1,000 nm (average is ~200 nm) and a thickness of 1 nm. Single-side-polished (100) silicon wafers (University Wafer, South Boston, Mass.) were used as the substrate for film thickness characterization and 125-µm thick polystyrene (PS) film (Goodfellow, Oakdale, Pa.) was used for TEM images. Polylactic acid (PLA) films, with a thickness of 500 µm, were used for oxygen-barrier testing. Polyester-based polyurethane (PU) foam (United Foam, Denver, Colo.), with 100 pores per linear inch (ppi) and without flame-retardant additives, was used for the flammability experiments.

Layer-by-Layer (LbL) Deposition. Prior to deposition, the silicon wafers were rinsed with acetone and deionized water, and then dried with filtered air. In the case of PS and PLA, methanol was used in place of acetone. These substrates were then corona-treated, using a Model BD-20C Corona Treater (Electro-Technic Products, Inc., Chicago, Ill.), to create a negative surface charge. Foam samples were dipped into 0.1 M nitric acid for 30 s prior to LbL deposition, and then dipped into a 1 wt. % branched polyethylenimine solution (pH 10, molecular weight of MW=25 kDa) as a primer layer, to improve adhesion. All films were deposited on a given substrate. Substrates were alternately dipped into positive and negative mixtures. Initial dips were 5 min each, and subsequent dips were 1 min. Each dip was followed by rinsing with deionized water and, in the case of the silicon wafer, PS, or PLA film, drying with air. Foams were wringed out to expel liquid as an alternative to the traditional drying step. After the desired number of bilayers was deposited, foam samples were dried at 80° C. in an oven for 2 h before testing.

Characterization of Film Growth, Structure, and Properties. Film thickness was measured with a Model alpha-SE Ellipsometer (J.A. Woollam Co., Inc., Lincoln, Nebr.). The weight per deposited layer was measured with a Maxtek Research Quartz Crystal Microbalance (RQCM) (Infinicon, East Syracuse, N.Y.), with a frequency range of 3.8-6 MHz, in conjunction with 5 MHz quartz crystals. Cross sections of clay-chitosan assemblies were imaged via transmission electron microscopy (TEM; Model 1200 EX, JEOL, Ltd., Tokyo, Japan), operated at 110 kV. Samples were prepared for imaging by embedding a piece of PS supporting the LbL film in epoxy and sectioning it with a microtome equipped with a diamond knife. Surface images of the control and coated foam samples were acquired via field-emission scanning electron microscopy (FESEM; Model JSM-7500F, JEOL, Ltd., Tokyo, Japan). Platinum coating of 8 nm was deposited on all samples prior to the imaging, to prevent charging. The surface topography was imaged via atomic force microscopy (AFM; Nanosurf EasyScan 2 system, Nanoscience Instruments, Inc., Phoenix, Ariz.). Foam flammability was evaluated by exposure to direct flame from a butane micro torch (Model ST2200, Benzomatic, Huntersville, N.C.) for 10 s (the approximate flame temperature is 2400° F., blue flame). Cone calorimetry was performed at the University of Dayton Research Institute, using an FTT Dual Cone Calorimeter at one heat flux (35 kW/m2), with an exhaust flow of 24 L/s, using the standardized cone calorimeter procedure (ASTM E-1354-07). Oxygen transmission rate of thin films on PLA was measured by MOCON (Minneapolis, Minn.) in accordance with ASTM D-3985, using an Oxtran Model 2/21 ML instrument at 23° C. and 0% relative humidity (RH).

Figure 16A:
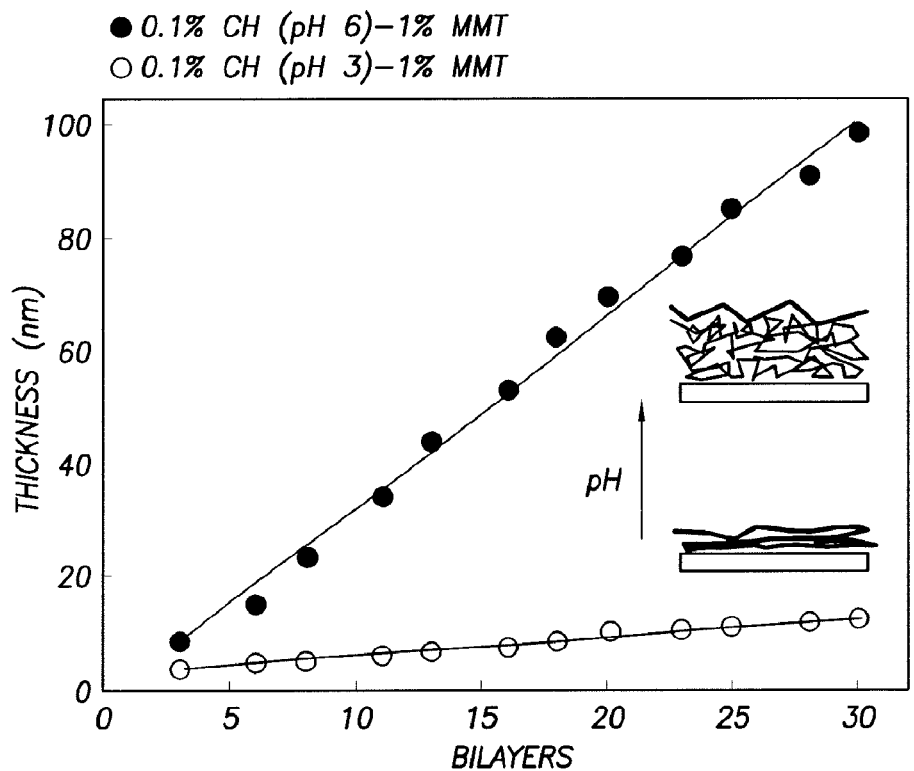
FIG. 16(a) illustrates thickness of chitosan-clay assemblies.
Figure 16B:
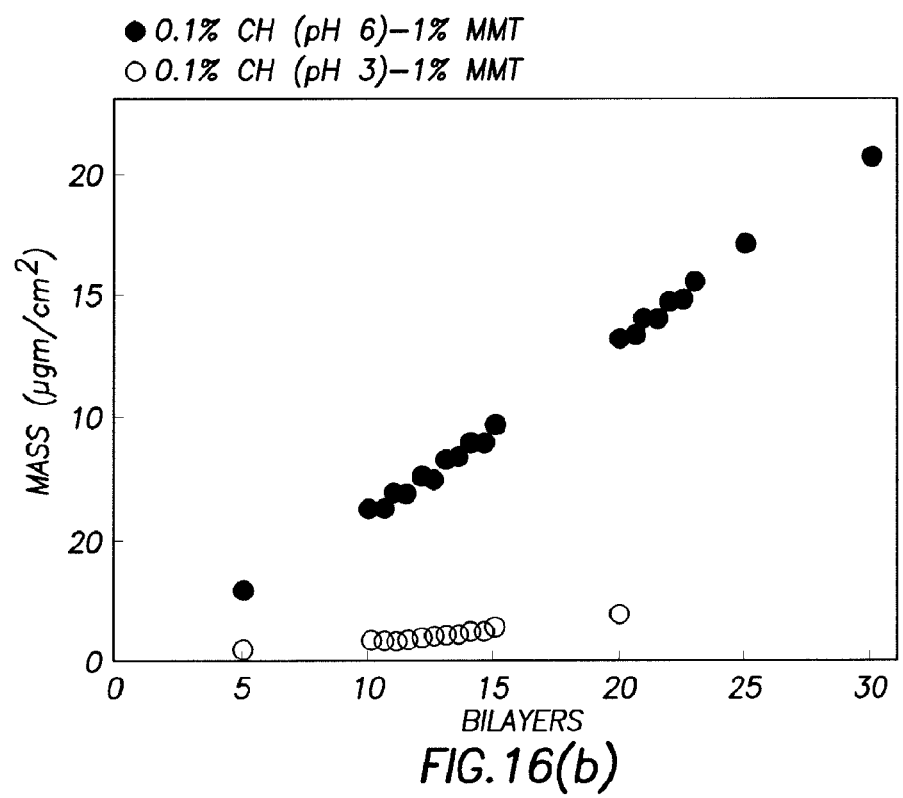
FIG. 16(b) illustrates mass of chitosan-clay assemblies.

FIGS. 16(a), (b) show the thickness and mass of chitosan-clay assemblies, as a function of the number of bilayers deposited. FIG. 17 shows the heat-release rate (HRR), as a function of time, during cone calorimeter testing, for uncoated control and 10-BL-coated foam. Table 8 shows the composition and density of CH-MMT assemblies. Table 9 shows the oxygen permeability of CH pH 6-MMT assemblies on PLA film at 23° C. Table 10 shows the oxygen permeability of various barrier materials. Table 11 shows the cone calorimeter results for the control and the 10-BL-coated foam.

TABLE 8

|  | CH (wt. %) | MMT (wt. %) | Density (g/cm$^3$) |
|---|---|---|---|
| CH pH 3-MMT | 33.79 | 66.21 | 1.19 |
| CH pH 6-MMT | 10.69 | 89.31 | 1.89 |

TABLE 9

| number of BL | film thickness (nm) | OTR (cm$^3$/(m$^2$ atm day)) | ** film | ** Total |
|---|---|---|---|---|
| 0 | N/A | 30.54 | N/A | 177.2 |
| 10 | 31.8 | 2.51 | 0.0019 | 14.6 |
| 15 | 48.9 | 0.68 | 0.0008 | 4.0 |
| 20 | 69.8 | 0.44 | 0.0006 | 2.6 |
| 25 | 85.6 | 0.13 | 0.0002 | 0.8 |
| 30 | 98.7 | <0.005 | <0.000008 | <0.03 |

** Permeability ($\times 10^{-16}$ cm$^3$ cm/(cm$^2$ s Pa))

TABLE 10

| film composition | Permeability ($\times 10^{-16}$ cm$^3$ cm/(cm$^2$ s Pa)) | reference |
|---|---|---|
| pure chitosan | 1770000 | 61 |
| chitosan/10 wt. % clay | 141000 | 61 |
| PLA/10 wt. % clay | 50.49 | 62 |
| PET | 17.3 | 29 |
| EVOH | 0.0571 | 63 |
| 30 BL CH/MMT on PLA film | <0.03 | Table 9. |

All measurements were performed at 23° C. and 0% RH.

TABLE 11

| sample | weight gain (%) | pkHrr (kW/m$^2$) | avg HRR (kW/m$^2$) | total HRR (mJ/m$^2$) | Mass loss (%) | MAHRE (kW/m$^2$) |
|---|---|---|---|---|---|---|
| Control |  | 517 ± 33.9 | 178 ± 12.5 | 18.9 ± 1.6 | 100 | 286 ± 22.6 |
| CH pH 3-MMT | 1.59 | 326 ± 60.9 | 144 ± 18.6 | 17 ± 0.2 | 94 ± 1.8 | 209 ± 46.2 |
| CH pH 6-MMT | 4.01 | 246 ± 5.4 | 116 ± 7.9 | 17 ± 0.4 | 93 ± 1.4 | 148 ± 7.7 |

CONCLUSIONS

Films assembled with high-pH or low-pH chitosan (CH) and clay (montmorillonite, MMT) showed linear growth as a function of the number of bilayers deposited. Higher chitosan pH resulted in much thicker assemblies with higher clay loading. An oxygen permeability of <0.03×10-16 cm$^3$ cm/(cm$^2$ s Pa) was achieved with 30 bilayers (30 BL) of CH pH 6-MMT (<100 nm thick). The combination of all of these features—it is generally recognized as a safe material, it has high oxygen barriers, and the transparency exhibited by this film—makes it an ideal candidate for food and other types of high-performance packaging. When a flexible polyurethane (PU) foam was coated with 10 BL of CH pH 6-MMT, only the outermost surface was charred after being exposed to the direct flame from a propane torch for 10 s. When cut open, an undamaged white flexible foam was revealed under a black char layer. Cone calorimetry revealed that this protective nanocoating significantly reduced the peak heat release, relative to the uncoated control, showing a maximum reduction of 52%. This work demonstrated the first fully renewable flame-retardant treatment made via layer-by-layer (LbL) assembly and provides an environmentally benign alternative to commonly used halogenated materials.

Example 6

Fabric was coated using aqueous solutions of chitosan (CH) and poly (sodiumphosphate) (PSP) and rinsed in 10 liter bath sonicators filled with deionized water for 1 minute between depositions. Without sonication, fabric coated with seventeen bilayers of CH/PSP were very stiff (shear stiffness of 6.5 gf/cm*deg), while coated fabric rinsed using ultra-sonication were not as stiff (shear stiffness of 1.3 gf/cm*deg). The reduction in linkages and aggregates were seen through use of scanning electron microscopy.

Although the present invention and its advantages have been described in detail, it should be understood that various changes, substitutions and alterations may be made herein without departing from the spirit and scope of the invention as defined by the appended claims.

What is claimed is:

1. A method for coating a substrate to provide a flame resistant substrate, comprising:
    exposing the substrate to a cationic solution to produce a cationic layer deposited on the substrate, wherein the cationic solution comprises cationic materials, and wherein the cationic materials comprise a polymer, a colloidal particle, a nanoparticle, a nitrogen-rich molecule, a geopolymer, a carbon-based filler, or any combinations thereof;
    exposing the cationic layer to an anionic solution to produce an anionic layer deposited on the cationic layer to produce a layer comprising the anionic layer and the cationic layer, wherein the anionic solution comprises a layerable material; and
    agitating the substrate during the steps of exposing, wherein the agitating comprises ultrasonication.

2. The method of claim 1, wherein the ultrasonication comprises a frequency from about 20 kHz to about 300 kHz.

3. The method of claim 1, wherein the agitating comprises agitating the substrate in the presence of the cationic solution, the anionic solution, or any combinations thereof.

4. The method of claim 1, further comprising rinsing the cationic layer deposited on the substrate, and wherein the agitating is accomplished during the rinsing.

5. The method of claim 1, further comprising rinsing the anionic layer deposited on the cationic layer, and wherein the agitating is accomplished during the rinsing.

6. The method of claim 1, wherein the layerable material comprises an anionic polymer, a colloidal particle, a phosphated molecule, a sulfated molecule, a boron-containing polymer, a carbon-based filler, or any combinations thereof.

7. The method of claim 1, wherein the substrate comprises a primer layer.

8. The method of claim 1, wherein the substrate comprises a fabric.

9. The method of claim 1, wherein the agitating is from about 0.1 seconds to about 10 minutes.

10. A method for coating a substrate to provide a flame resistant substrate, comprising:
    exposing the substrate to an anionic solution to produce an anionic layer deposited on the substrate, wherein the anionic solution comprises a layerable material;
    exposing the anionic layer to a cationic solution to produce a cationic layer deposited on the anionic layer to produce a layer comprising the anionic layer and the cationic layer, wherein the cationic solution comprises cationic materials, and wherein the cationic materials comprise a polymer, a colloidal particle, a nanoparticle, a nitrogen-rich molecule, a geopolymer, a carbon-based filler, or any combinations thereof; and
    agitating the substrate during the steps of exposing, wherein the agitating comprises ultrasonication.

11. The method of claim 10, wherein the ultrasonication comprises a frequency from about 20 kHz to about 300 kHz.

12. The method of claim 10, wherein the agitating comprises agitating the substrate in the presence of the cationic solution, the anionic solution, or any combinations thereof.

13. The method of claim 10, further comprising rinsing the anionic layer deposited on the substrate, and wherein the agitating is accomplished during the rinsing.

14. The method of claim 10, further comprising rinsing the cationic layer deposited on the anionic layer, and wherein the agitating is accomplished during the rinsing.

15. The method of claim 10, wherein the layerable material comprises an anionic polymer, a colloidal particle, a phosphated molecule, a sulfated molecule, a boron-containing polymer, a carbon-based filler, or any combinations thereof.

16. The method of claim 10, wherein the substrate comprises a primer layer.

17. The method of claim 10, wherein the substrate comprises a fabric.

18. The method of claim 10, wherein the agitating is from about 0.1 seconds to about 10 minutes.

* * * * *